US010522160B2

(12) United States Patent
Kar

(10) Patent No.: US 10,522,160 B2
(45) Date of Patent: Dec. 31, 2019

(54) METHODS AND APPARATUS TO IDENTIFY A SOURCE OF SPEECH CAPTURED AT A WEARABLE ELECTRONIC DEVICE

(71) Applicant: Intel Corporation, Santa Clara, CA (US)

(72) Inventor: Swarnendu Kar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 109 days.

(21) Appl. No.: 15/681,159

(22) Filed: Aug. 18, 2017

(65) Prior Publication Data

US 2019/0057705 A1 Feb. 21, 2019

(51) Int. Cl.
*G10L 19/02* (2013.01)
*G10L 17/00* (2013.01)
*G10L 21/0232* (2013.01)
*G10L 21/0224* (2013.01)
*G10L 21/0216* (2013.01)
*G10L 25/51* (2013.01)
*G10L 25/18* (2013.01)

(52) U.S. Cl.
CPC ............ *G10L 19/02* (2013.01); *G10L 17/005* (2013.01); *G10L 21/0216* (2013.01); *G10L 21/0224* (2013.01); *G10L 21/0232* (2013.01); *G10L 25/51* (2013.01); *G10L 17/00* (2013.01); *G10L 25/18* (2013.01); *G10L 2021/02161* (2013.01)

(58) Field of Classification Search
CPC . G10L 19/02; G10L 21/0216; G10L 21/0232; G10L 17/005; G10L 21/0224; G10L 2021/02161

USPC ......................................................... 704/201
See application file for complete search history.

(56) References Cited

U.S. PATENT DOCUMENTS

| | | | |
|---|---|---|---|
| 4,978,931 A * | 12/1990 | Carp | H03H 7/20 333/139 |
| 9,264,824 B2 | 2/2016 | Pruthi et al. | |
| 2012/0282976 A1 | 11/2012 | Suhami | |
| 2015/0161998 A1 | 6/2015 | Park et al. | |
| 2017/0142507 A1* | 5/2017 | Chang | H04R 1/02 |
| 2017/0213459 A1* | 7/2017 | Ogaz | G01S 5/22 |

* cited by examiner

*Primary Examiner* — Bharatkumar S Shah
(74) *Attorney, Agent, or Firm* — Hanley, Flight & Zimmerman, LLC

(57) ABSTRACT

Methods, systems and articles of manufacture for a wearable electronic device having an audio source identifier are disclosed. Example audio source identifiers disclosed herein include first and second audio sensors disposed at first and second locations, respectively, on a wearable electronic device. Such audio source identifiers also include a phase shift determiner to determine a phase shift between a first sample of first audio captured at the first audio sensor and a second sample of the first audio captured at the second audio sensor. The first audio includes first speech generated by a first speaker wearing the wearable electronic device. Example audio source identifiers further include a speaker identifier to determine, based on the phase shift determined by the phase shift determiner, whether second audio includes speech generated by a second speaker wearing the wearable electronic device.

24 Claims, 12 Drawing Sheets

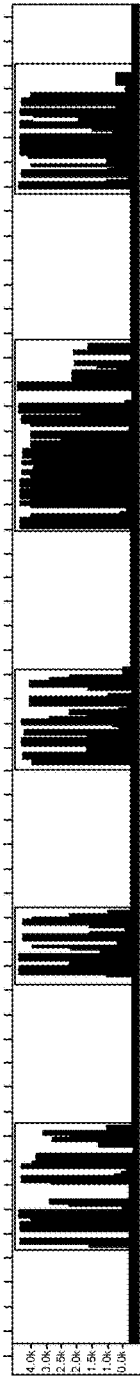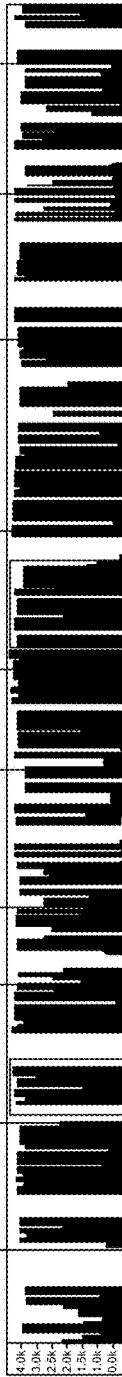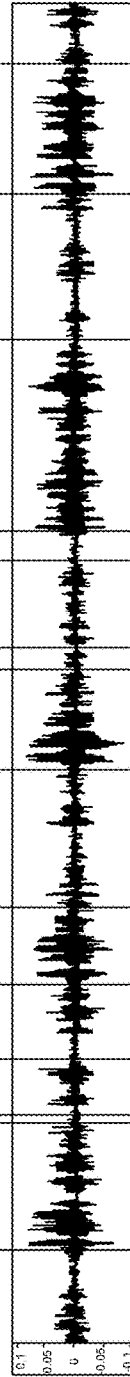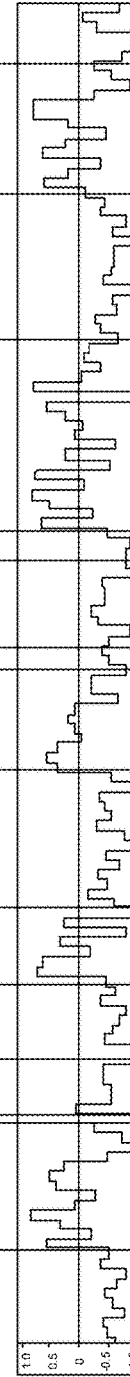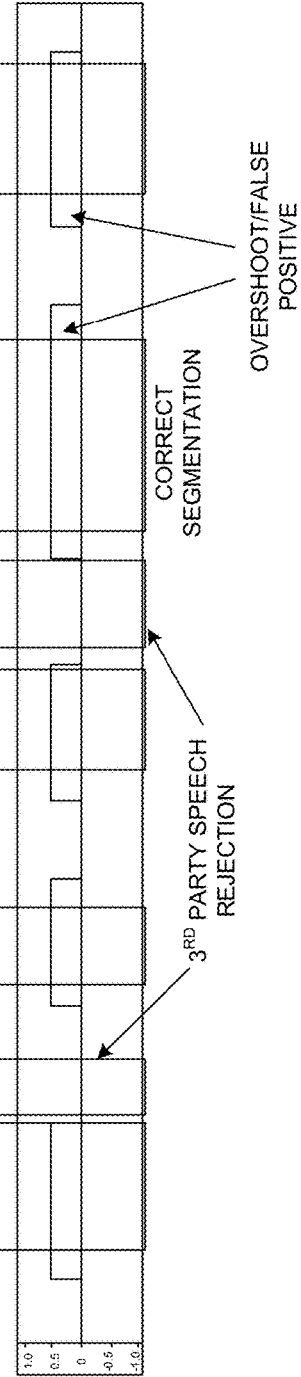
FIG. 8A WEARER SPEECH
FIG. 8B 3RD PARTY SPEECH
FIG. 8C AUDIO RECEIVED AT PRIMARY MIC. SNR=5dB
FIG. 8D TWO-MIC WEARER VAD LIKELIHOOD, PER 200ms CHUNKS
FIG. 8E PHRASE DETECTION BASED ON ABOVE LIKELIHOODS

METHODS AND APPARATUS TO IDENTIFY A SOURCE OF SPEECH CAPTURED AT A WEARABLE ELECTRONIC DEVICE

FIELD OF THE DISCLOSURE

This disclosure relates generally to wearable electronic devices, and, more particularly, to identifying a source of speech captured at a wearable electronic device.

BACKGROUND

Many modern electronic devices are capable of interacting with a user via spoken input that can include includes questions, commands, etc. Such electronic devices include audio sensors to capture speech, speech recognition technology to identify speech, and speech processing technology to translate the speech into text that can be acted upon by the electronic device. In most cases, such modern electronic devices rely on speech training techniques to learn the voice of the user. Such devices include software that instructs the user of the device to repeatedly vocalize a training phrase such as, "Hey Siri," or "Ok Google," which the electronic device records for later use. When the user wishes to engage the services of the electronic device using a spoken command or question, the user is instructed to preface such spoken commands/questions with the training phrase. Thereafter, the electronic device listens to audio/sound received at audio sensors disposed on (or in) the device and responds to such audio/sound when the audio/sound includes the training phrase spoken by the user.

BRIEF DESCRIPTION OF THE DRAWINGS

FIG. 8A, FIG. 8B, FIG. 8C, FIG. 8D, and FIG. 8E are a set of graphs representing various audio waveforms captured at and analyzed by the speech analysis manager of FIG. 1 and FIG. 2.

The figures are not to scale. Wherever possible, the same reference numbers will be used throughout the drawing(s) and accompanying written description to refer to the same or like parts.

DETAILED DESCRIPTION

Figure 1:
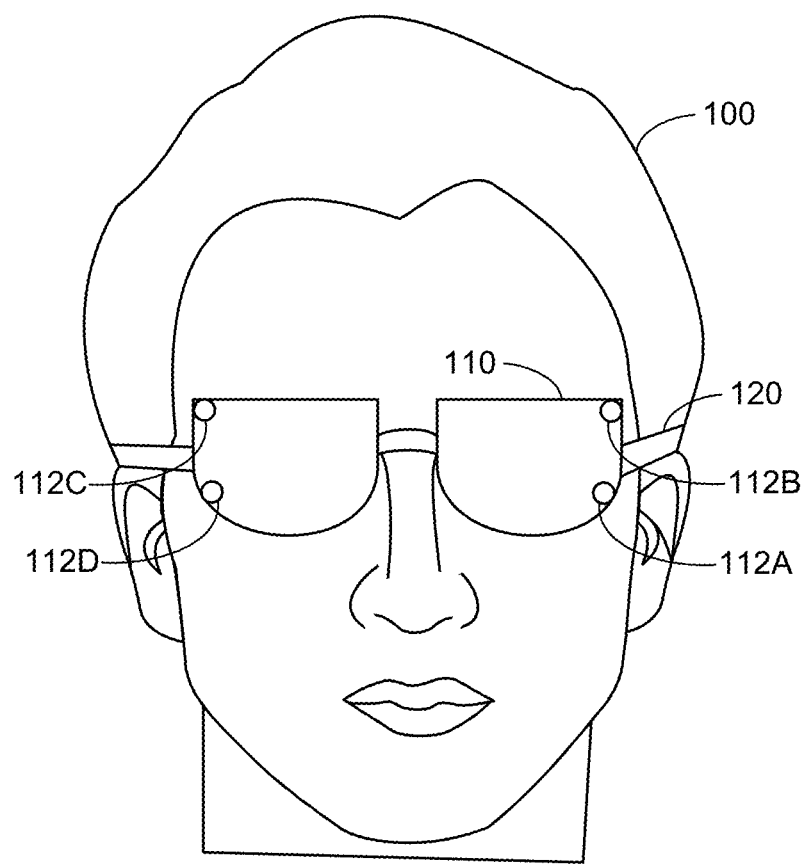
FIG. 1 is an illustration of a user wearing an example wearable electronic device having an example speech analysis manager installed therein.

Many electronic devices are capable of engaging with a user via voice commands and/or questions spoken by the user. Such electronic devices typically include audio sensors to capture speech, speech recognition technology to identify speech, and speech processing technology to translate the speech into text that can be acted upon by the electronic device. Many available electronic devices capable of responding to user speech rely on speech training techniques to learn the voice of the user. Such devices typically include software that instructs the user of the device to repeatedly vocalize a training phrase such as, "Hey Siri," or "Ok Google," which the electronic device records for subsequent use in recognizing speech uttered by the user (as opposed to speech uttered by a non-user of the electronic device). To enlist the services of the electronic device using a spoken command or question, the user prefaces such spoken commands/questions with the training phrase. Thereafter, the electronic device listens to audio received at audio sensors disposed on (or in) the device and responds to such audio when the audio includes the training phrase spoken by the user. These conventional techniques for recognizing and responding to vocal commands, although effective, are not ideal due to the need to perform speech training before the voice recognition features can be used. As a result, such electronic devices are incapable of responding to spoken commands right out of the box. Further, some users find such voice recognition and processing techniques to be cumbersome and unnatural to use because of the need, by the user, to preface commands with the given training phrase (e.g., "Hey Siri," "Ok Google." etc.). Conventional voice recognition and processing techniques are further limited in that the devices deploying such techniques are only capable of responding to speech uttered by a single user (e.g., the user who provides the training speech samples) and are incapable of replying to any other user of the device. Thus, while such conventional techniques are well suited to electronic devices, such as smart phones, that are associated with a single user, such conventional techniques are not practical in devices intended for multiple users. One example type of electronic device often associated with multiple users is a visual reality device such as glasses (e.g., smart glasses) having built-in computer processing capability. Smart glasses used for visual reality applications (e.g., gaming) are often used by multiple different wearers at different times. It would be impractical to require each such user to have to voice-train the device before usage. Due to the identified shortcomings in the existing technologies, there is a need in the art for an improved technique by which electronic devices can recognize and respond to vocalized commands by a user and/or users of the device.

Methods, apparatus, and articles of manufacture disclosed herein determine whether audio/sound collected by an example wearable electronic device includes speech generated by a user/speaker who is wearing the device. If so, the wearable electronic device processes the speech to identify the content and responds to any device commands/questions included therein. The example wearable electronic devices disclosed herein include audio sensors to collect ambient audio signals and also include a speech analysis manager to process the audio signals captured by the audio sensors. The speech analysis manager operates as an audio source identifier by determining whether audio captured at the wearable electronic device is generated by a wearer of the wearable electronic device or another source.

The audio sensors are disposed at fixed locations on the wearable electronic device and a first sample of an ambient audio signal captured at a first of the audio sensors is compared to a second sample of the ambient audio signal captured at a second of the audio sensors. Due to the distance between the first audio sensor and the wearer's mouth and the distance between the second audio sensor and the wearer's mouth, the first and second samples will be out of phase (phase-shifted). Further, because the positions of the first and second audio sensors are fixed relative to each other and relative to the wearer's mouth, samples collected at the first audio sensor and corresponding to a first frequency will be phase-shifted by a determinable, fixed amount from samples collected at the second audio sensor that correspond to the first frequency. The example wearable electronic device having the example speech analysis manager disclosed herein takes advantage of that fact by determining an amount of phase shift experienced at selected frequencies between first samples collected at the first audio sensor and second samples collected at the second audio sensor when the audio is known to include speech generated by a user/speaker who is wearing the wearable electronic device. The amount of phase shift between the first audio sample and the second audio sample at each of the selected frequencies, when plotted in a graphical representation (e.g., the y axis reflecting the phase shifts, and the x axis reflecting frequencies at which the phase shifts are measured), forms a line having a slope. Further, any other audio signals that include speech generated by a wearer of the wearable electronic device, when collected in a same or similar manner (e.g., at the first and second audio sensors when the wearer is speaking), should result in a line having the same (or nearly same) slope. Thus, the wearable electronic device and speech analysis manager is programmed to include an expected slope representing the expected phase shift at each of a set of frequencies when a signal containing speech signals generated by the wearer of the electronic device are collected and processed.

When the wearable electronic device is subsequently used, samples of audio data are used to measure phase shifts between the audio signals collected at different audio sensors and occurring at various frequencies. The measured phase shifts at the frequencies can then be compared to the expected phase shifts at the same frequencies, as derived from the expected slope programmed into the electronic wearable device. If the comparison yields an error value in excess of a threshold value, then the audio data collected at the audio sensors is determined not to include speech generated by the wearer of the wearable electronic device and is disregarded. If the comparison yields an error value less than (or, in some cases, equal to) the threshold value, the audio data collected at the audio sensors is determined to include speech generated by the wearer of the wearable electronic device. The wearable electronic devices disclosed herein further include a phrase identifier to identify a phrase in the audio data determined to include speech generated by the wearer. Additionally, the disclosed wearable electronic devices include a phrase responder which responds to the phrase in a manner appropriate to the content of the phrase.

For robustness, the wearable electronic device includes multiple pairs of audio sensors and is programmed to include an expected slope for each pair of audio sensors. Ambient audio signals collected at each pair of audio sensors are used to calculate, for each audio sensor pair, a set of phase shifts occurring at a set of frequencies which can then be compared to the corresponding expected phase shifts derived from the corresponding expected slopes. Based on the comparison, error values are determined for the audio signal collected by each pair of audio sensors and used to determine whether the audio signal includes speech generated by a wearer of the wearable electronic device. Although a wearable electronic device including four audio sensors is disclosed herein, wearable electronic devices having a greater or lesser number of sensors can also be used to identify speech generated by a wearer of the wearable electronic device in the manner disclosed herein.

The disclosed speech analysis manager is further configured to perform phrase detection by stringing together chunks of the collected audio signal determined to contain speech generated by a wearer of the wearable electronic device and eliminating chunks of the collected audio determined not to contain wearer generated speech. In some examples, the phrase detection performed by the speech analysis manager includes resizing chunks of collected audio to thereby enhance the ability of the wearable electronic device to detect the beginning of a phrase spoken by the wearer as well as the end of such a phrase.

The disclosed wearable electronic devices having the speech analysis manager provide the ability to detect speech of a user of the electronic device without the need to perform voice recognition training, making the usage of the voice detection features effortless to the user. In addition, the disclosed wearable electronic devices are able to detect wearer/user speech without the need to preface such speech with key phrases, a practice that can feel forced and artificial to users. Further, the wearable electronic devices disclosed herein are able to differentiate the speech of not only a single user but the speech of any user who is wearing the device from the speech of non-wearers of the device thereby rendering the devices suitable for multi-user applications.

FIG. 1 is an illustration of a user 100 (also referred to as the "wearer") wearing an example wearable electronic device 110 having an example first audio sensor 112A, an example second audio sensor 112B, an example third audio sensor 112C, and an example fourth audio sensor 112D, all coupled to an example speech analysis manager 120. In some examples, the audio sensors 112A and 112B form a first audio sensor pair P1, the audio sensors 112A and 112C form a second audio sensor pair P2, the audio sensors 112A and 112D form a third audio sensor pair P3, the audio sensors 112B and 112C form a fourth audio sensor pair P4, the audio sensor 112B and 112D form a fifth audio sensor pair P5, and the audio sensor 112C and 112D form a sixth audio sensor pair P6. When the wearer 100 of the wearable electronic device 110 speaks, the resulting audio signals containing the wearer's speech will arrive at the audio sensors 112A-112D at different times based on the distance between the wearer's mouth and each of the audio sensors 112A-112D. The arrival of the audio signal at the audio sensors 112A-112D at different times results in a phase shift between the audio signal samples captured at each of the audio sensors 112A-112D. As such, the different times of arrival at the audio sensors 112A-112D cause the audio signal samples captured at each of the audio sensors 112A-112D to be at least slightly different. Using the characteristics of wave propagation, the amount of phase shift ($\psi_A$-

ψ$_B$) between a first audio sample captured at the first audio sensor 112A and a second audio sample captured at the second audio sensor 112B is related to the frequency (f) of the audio signal being sampled, and the effective distance (d$_{AB,eff}$) between the first and second audio sensors 112A and 112B as shown in Equation 1 below.

$$\psi_A - \psi_B = 2\pi f \frac{d_{AB,eff}}{v} = m_{i,j} f \quad \text{Equation 1}$$

In Equation 1, m$_{ij}$ (also referred to as m$_{P1}$) represents the slope of a line reflecting the change in phase shift of the audio signal arriving at the first audio sensor 112A and at the second audio sensor 112B as a function of frequency, f, and v represents the speed of sound. The effective distance (e.g., d$_{ij,eff}$) between the pairs of audio sensors (P1, P2, P3, P4, P5 and P6) is measurable and, thus, known. In some examples, the speech analysis manager 120 collects a first audio signal known to contain speech generated by the wearer 100 (who can be any wearer) of the wearable electronic device 110 and processes the first audio signal to estimate an expected slope (m$_{P1}$, m$_{P2}$, m$_{P3}$, m$_{P4}$, m$_{P5}$, m$_{P6}$) for each of the audio sensor pairs (P1, P2, P3, P4, P5, P6) when a captured audio signal includes wearer-generated speech, as described in further detail below. The expected slopes (m$_{P1}$, m$_{P2}$, m$_{P3}$, m$_{P4}$, m$_{P5}$, m$_{P6}$), which are stored by the speech analysis manager 120, each represent an expected value of the slope (m) when an audio signal captured by a corresponding audio sensor pair (P1, P2, P3, P4, P5, P6) contains speech generated by the wearer 100 of the wearable electronic device 110. When a second (also referred to as ambient) audio signal having an unknown source (e.g., the ambient audio signal may or may not contain wearer-generated speech) is later collected by the audio sensor pairs (P1, P2, P3, P4, P5, P6), the speech analysis manager 120 uses the expected slopes (m$_{P1}$, m$_{P2}$, m$_{P3}$, m$_{P4}$, m$_{P5}$, m$_{P6}$) to determine whether the ambient audio signal contains speech generated by the wearer 100. In some examples, the speech analysis manager 120 makes the determination by analyzing the ambient audio signal to extract, for each of a set of frequencies, a phase shift between audio sensor samples collected by each audio sensor included in each of the audio sensor pairs (P1, P2, P3, P4, P5, P6). The speech analysis manager 120 then compares the extracted phase shift values (also referred to a measured phase shift values) for one of the audio sensor pairs (e.g., P1) to expected phase shift values that are derived using the expected slope of the same audio sensor pair (e.g., P1). If the comparison indicates that an amount of error (also referred to as an amount of mismatch) between the extracted phase shift values and the measured phase shift values is greater than a threshold value, the ambient audio signal is determined not to include speech generated by the wearer 100 of the wearable electronic device 110 and can be eliminated/disregarded. If the comparison indicates that the amount of error/mismatch between the extracted phase shift values and the expected phase shift values is less than a threshold value, the ambient audio signal is determined to include speech generated by the wearer 100 of the wearable electronic device 110. The ambient audio signal containing the speech is then further analyzed to detect a phrase included therein and to respond to the detected phrase in an appropriate manner.

Figure 2:
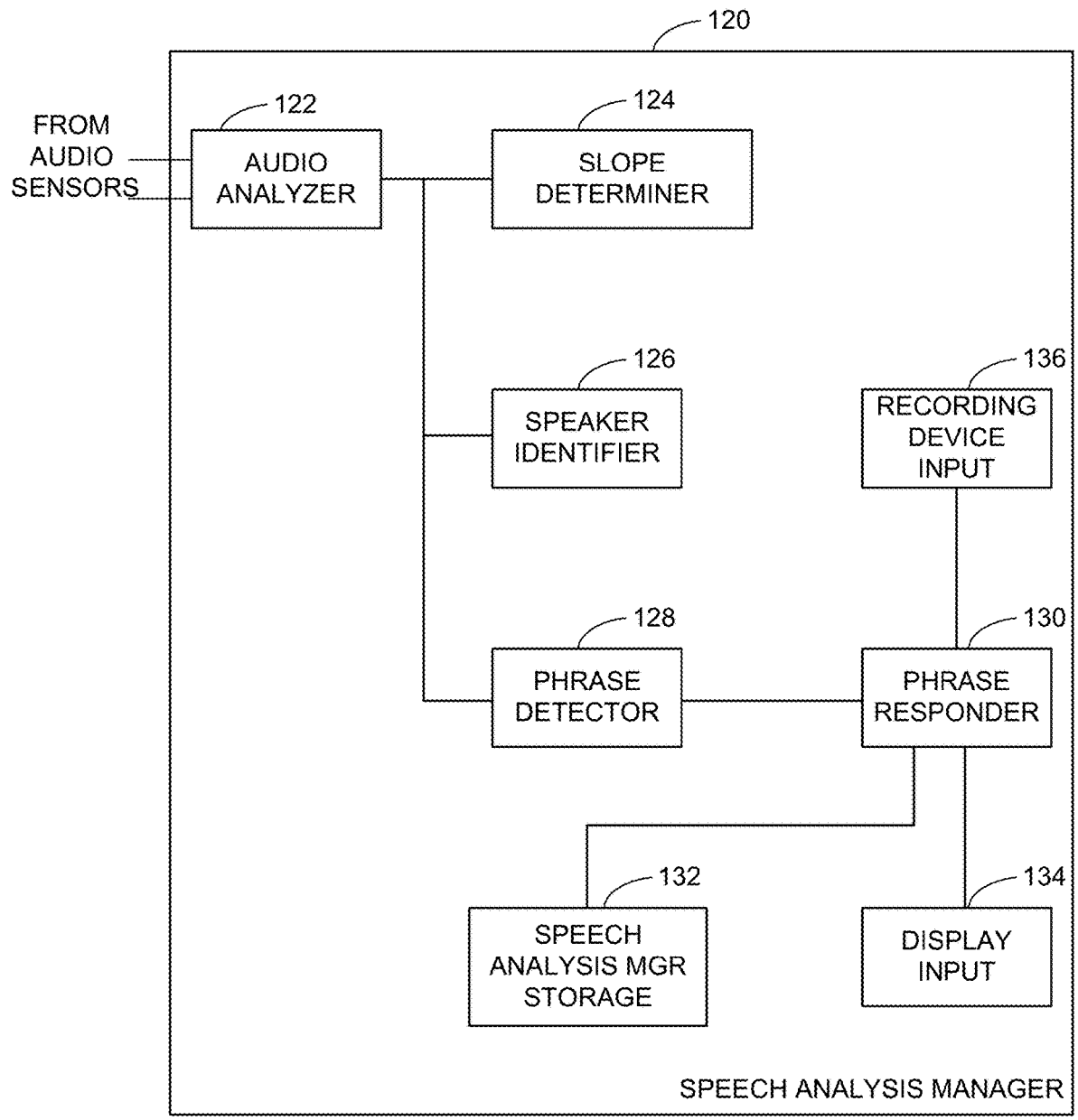
FIG. 2 is a block diagram of an example implementation of the speech analysis manager of FIG. 1.

FIG. 2 is a block diagram of an example implementation of the speech analysis manager 120 and includes an example audio analyzer 122, an example slope determiner 124, an example speaker identifier 126, an example phrase detector 128, an example phrase responder 130, an example speech analysis manager storage 132, an example display output 134, and an example recorder input 136. In some examples, the audio analyzer 122 receives audio signals captured at the audio sensors 112A, 112B, 112C, and 112D and analyzes the signals using a variety of techniques (described with respect to FIG. 3 below) to extract information from the audio samples. The extracted information is supplied to the slope determiner 124 which uses the information to generate an expected slope (e.g., m$_{P1}$, m$_{P2}$, m$_{P3}$, m$_{P4}$, m$_{P5}$, m$_{P6}$) for each audio sensor pair (P1, P2, P3, P4, P5, P6) (based on a first audio signal known to contain speech generated by the example wearer 100 of the example wearable electronic device 110). The expected slope for each audio sensor pair (P1, P2, P3, P4, P5, P6) is stored by the speech analysis manager 120 for use in determining whether ambient audio signals captured at the audio sensor pairs (P1, P2, P3, P4, P5, P6) at a later time include wearer-generated speech.

The audio analyzer 122 analyzes the ambient/second audio signal (which may or may not contain wearer-generated speech) captured by the audio sensors (112A, 112B, 112C, and 112D), to identify a phase value corresponding to each of a set of frequencies included in the ambient audio signal. The slope determiner 124 uses the resulting phase values extracted from the ambient audio signal captured at each audio sensor (112A, 112B, 112C, and 112D) to identify a phase shift between audio samples captured at the different audio sensors included in each of the audio sensor pairs (P1, P2, P3, P4, P5, and P6). Thus, for a first frequency, a first phase value of the ambient audio signal captured at the first audio sensor 112A is subtracted from a first phase value of the ambient audio signal captured at the second audio sensor 112B. The resulting value is a first phase shift value corresponding to the first audio sensor pair P1. Likewise, for the first frequency, a first phase value of the ambient audio signal captured at the first audio sensor 112A is subtracted from a first phase value of the ambient audio signal captured at the third audio sensor 112C. The resulting value is a second phase shift value corresponding to the second audio sensor pair P2, and so on.

In addition, the example speaker identifier 126 determines, for each audio sensor pair (P1, P2, P3, P4, P5, and P6), how closely the extracted/measured phase shifts at the corresponding frequencies match the expected phase shifts occurring at the same frequencies. The expected phase shifts are derived based on the expected slopes calculated for each audio sensor pair (P1, P2, P3, P4, P5, and P6). When there is a small amount of mismatch between the extracted/measured phase shifts (generated from the ambient audio) and the expected phase shifts (generated from the wearer-generated audio signal), a low error value will result and the ambient audio signal will be determined to contain wearer-generated speech. When the amount of mismatch between the extracted/measured phase shifts and the expected phase shifts is sufficiently high, a high error value will result, and the ambient audio signal will be determined not to include wearer-generated speech.

When the ambient audio signal is determined to include wearer-generated speech, the ambient audio signal (captured at one or more of the audio sensors) is provided to the example phrase detector 128 which identifies chunks of the ambient audio signal containing wearer-generated speech and eliminates chunks not containing wearer-generated speech to obtain a detected phrase. The detected phrase is transmitted to the phrase responder 130 which uses speech processing techniques including, natural language processing, word parsing, etc., to convert the speech to text and takes action to respond to the text, if appropriate. For example, when the text includes a request to begin recording, the phrase responder 130 can activate a recording device via the example recording device input 136. When the text includes a request to display information, the phrase responder 130 can supply the information to be presented to the display input 134 for transmission to a display of the wearable electronic device 110. In addition, or instead, the phrase responder 130 can take any number of actions in response to the detected phrase.

Figure 3:
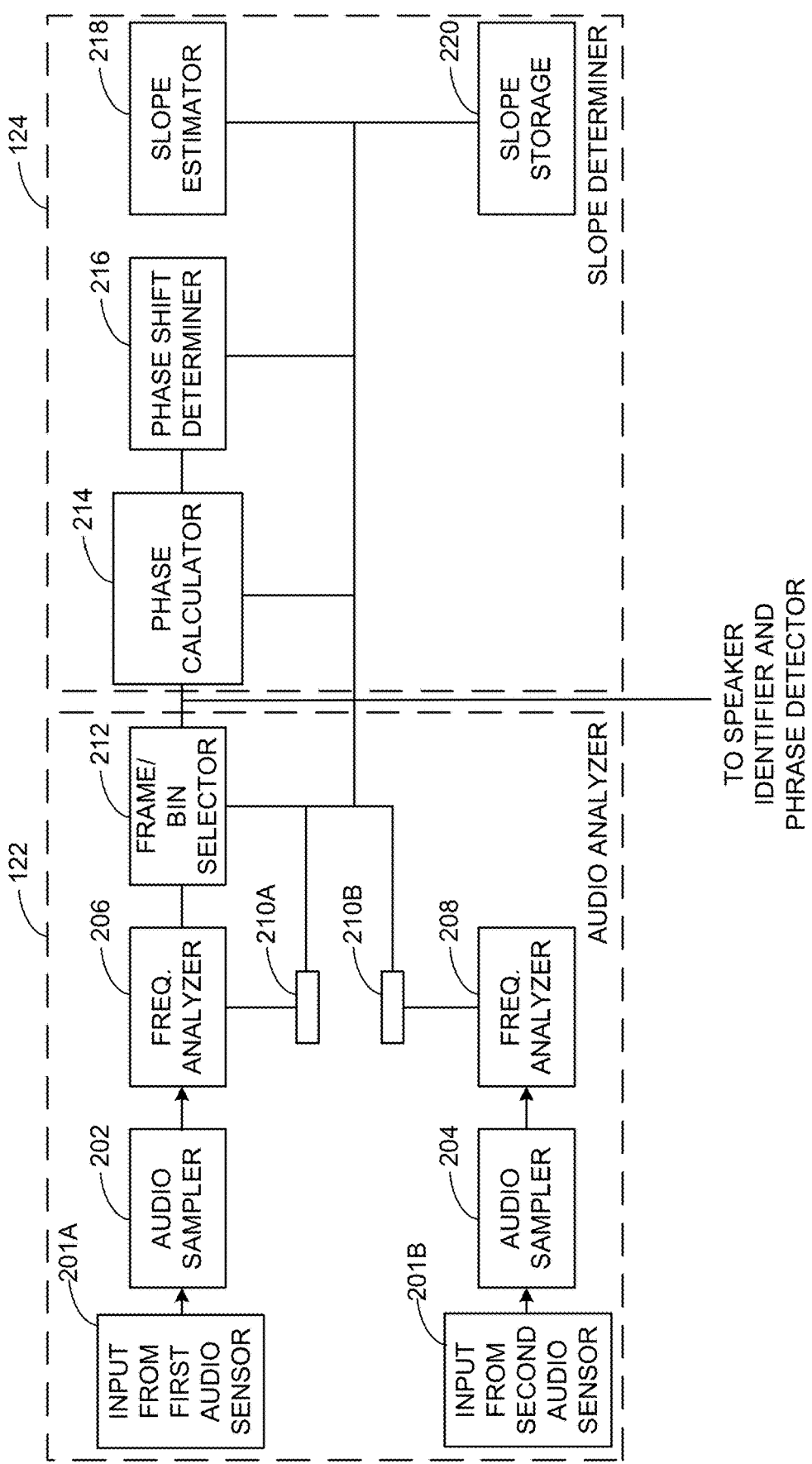
FIG. 3 is a block diagram of an example implementation of an example audio analyzer and an example slope determiner of the example speech analysis manager of FIG. 2.

FIG. 3 is a block diagram of an example implementation of the example audio analyzer 122 and the example slope determiner 124 of FIG. 2. In the illustrated implementation, the audio analyzer 122 includes a first input 201A from the first audio sensor 112A, a second input 201B from the second audio sensor 112B, a first audio sampler 202, a second audio sampler 204, a first frequency analyzer 206, and a second frequency analyzer 208, example first and second storages 210A, 210B coupled to the first and second frequency analyzers 206, 208, respectively, and a frame/bin selector 212.

In some examples, to derive a first expected slope, $m_{P1}$, of an audio signal containing wearer-generated speech that corresponds to the first audio sensor pair P1, the example wearer 100 (which, again, can be any wearer) of the wearable electronic device 110 speaks. The audio signal containing the wearer-generated speech arrives at, and is captured by, the first audio sensor 112A and the audio signal arrives at, and is captured by the second audio sensor 112B. Based on the fact that the second audio sensor 112B is farther from the source of the audio signal (i.e., the wearer's mouth) than the first audio sensor 112A, the audio signal arrives at the first audio sensor 112A before arriving at the second audio sensor 112B. Thus, the audio signal captured at the second audio sensor 112B is out of phase with the audio signal captured at the first audio sensor 112A.

The output of the example first audio sensor 112A is supplied to the example first audio sampler 202 and the output of the second audio sensor 112B is supplied to the example second audio sampler 204. The first and second audio samplers 202, 204 segment the audio signal supplied at the output of the first and second audio sensors 112A, 122B, respectively, into a first and second set of frames (e.g., 16 ms frames with 8 ms overlap between neighboring frames). The frames of audio (which are numbered using an index n=1, 2, . . . , N) are provided by the respective first and second audio samplers 202, 204 to the example first and example second audio frequency analyzers 206, 208. The first and second audio frequency analyzers 206, 208 analyze the first and second sets of frames, respectively, using, for example, a short term fast Fourier transform ("STFT") technique. After performing the STFT on each frame in the first and second sets of frames, each frame is represented as pulses residing in frequency bins (which are numbered using the index f=1, 2, . . . , $N_{FFT}/2$). Further, the magnitude of each of the pulses represents the energy of the signal at that frequency. In addition, the results of the STFT performed on each frame, n, yield a phase angle ($\psi$) corresponding to each frequency bin, f. The information derived by the first frequency analyzer 206 from the audio signal sampled by the first audio sampler 202 includes n sets off frequency bins, each associated with a corresponding phase angle ($\psi$) and energy value, and is stored in the first storage 210A. The information derived by the second frequency analyzer 208 from the audio signal sampled by the second audio sampler 204 includes n sets off frequency bins, each associated with a corresponding phase angle ($\psi$) and energy value and is stored in the second storage 210B.

The example frame/bin selector 212 accesses the information stored in the first storage 210A and identifies, for each frequency bin, f, a fraction of the frames (e.g., 20% of the frames) having high energy content. In some examples, the frame/bin selector 212 uses the energy values associated with the frequency bins to evaluate the amount of signal energy included in each of the frequency bins relative to the amount of noise energy included in the same frequency bins and selects a subset of the frames meeting a threshold signal to noise ratio ("SNR") criteria. Due to the sparse nature of speech signals in both the time and the frequency domains, the subset of frames selected in a first of the frequency bins (e.g., f=1) may not be (and likely will not be) the same frames selected for analysis in a second of the frequency bins (e.g., f=2).

Referring still to FIG. 3, information identifying the subset of frames selected for each frequency bin, f, is supplied to the example phase calculator 214. The example phase calculator 214 determines a mean phase for each frequency bin, f, based on the phase angles corresponding to the selected frames (e.g., the subset of frames selected by the frame/bin selector 212). Selecting the frames having the highest energy values for each frequency bin, f, and using the phase angles corresponding to the selected frames to calculate a mean phase value for each frequency bin, f promotes inclusion of the portions of the audio signal contributed by speech and exclusion of the portions of the audio signal contributed by background noise. Thus, the output of the phase calculator 214 includes a first set of mean phase values (one corresponding to each frequency bin) representing the audio information collected at the first audio sensor 112A and second set of mean phase values (one corresponding to each frequency bin) representing the audio information collected at the second audio sensor 112B.

In some examples, the example phase shift determiner 216 determines the phase shift associated with each frequency bin by subtracting corresponding ones of the first set of mean phase values from corresponding ones of the second set of mean phase values, as described in Equation 2 below.

$$\Delta_{i,j}{}^f = \sqrt{\psi_{j,n}{}^f - \psi_{i,n}{}^f}, n \in N^f \qquad \text{Equation 2}$$

In Equation 2, the values i and j are used to represent an index of the audio sensors (e.g., i corresponds to the audio data collected by the first audio sensor 112A and j corresponds to the audio data collected by the second audio sensor 112B).

At the example slope estimator 218, a curve fitting technique is applied to estimate an expected slope, $m_{P1}$, for the first audio sensor pair, P1, and a phase unwrapping technique is used to unwrap the raw phase shift values calculated by the example phase shift determiner 216. The raw phase shift estimates wrap around ($\pi$, $-\pi$) thereby making a straight line representation of the raw phase shift data impossible. Unwrapping the raw phase shift values involves adding multiples of $2\pi$ to the raw phase shift values, as needed, to allow the formation of a straight line when plotting the raw phase shift values against the frequency bin values on a graph. In other words, for wrapped phase shift values between $-\pi$ and $\pi$ (e.g., $\Delta \in (-\pi, \pi]$) and an unwrap bias b, the unwrapped phase shift value ($U_b(\Delta)$), is defined as $\Delta$ added to a unique integer multiple of $2\pi$ (say n) such that $\Delta + 2\pi n \in (b-\pi, b+\pi]$. As a result of performing the unwrapping technique, the unwrapped phase shift values lie within the range ($b-\pi$, $b+\pi$). The expected slope estimation and unwrapping operation can be performed as a joint operation as represented by Equation 3, below.

$$m_{i,j} = \underset{m \in [-\beta, \beta]}{\mathrm{argmin}} \Sigma_f \left( U_{mf}(\Delta_{i,j}^f) - mf \right)^2 \qquad \text{Equation 3}$$

As stated above, in Equation 3, the unwrapped phased shift is calculated by adding multiples (k) of 2π (to the raw (wrapped) phase shift value $(U_b(\Delta)=\Delta+2\pi k)$ to cause the unwrapped phase shift to lie within the range (b−π, b+π) (e.g., $U_b(\Delta) \in (b-\pi, b+\pi]$).

Figure 4:
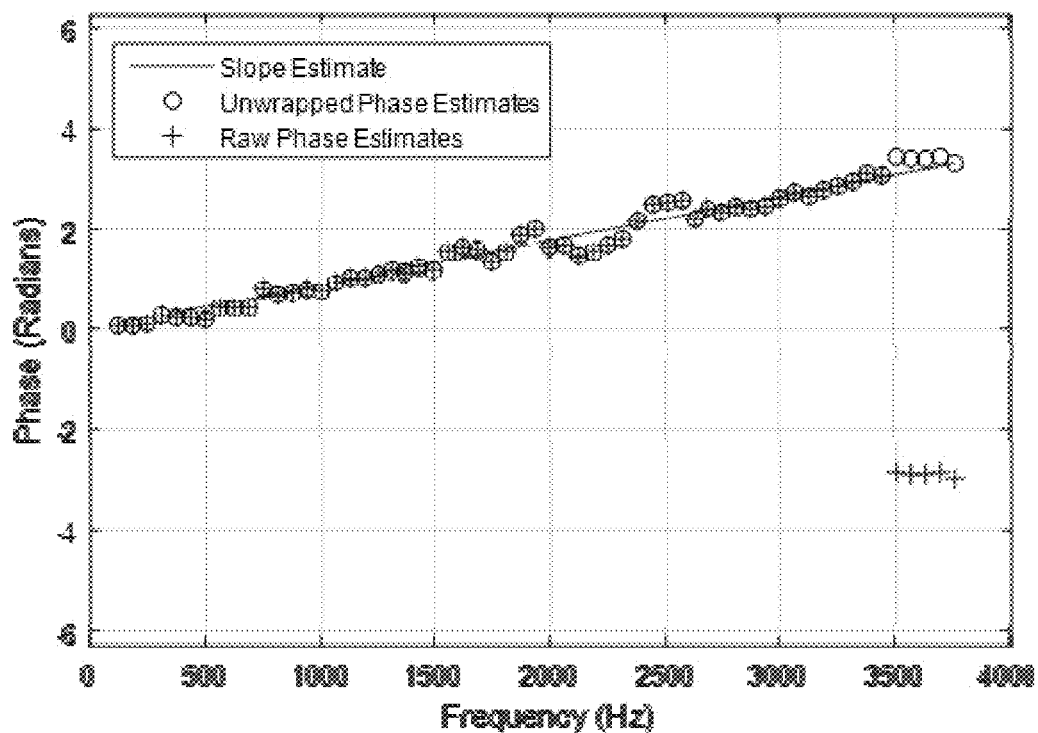
FIG. 4 is an example graph in which phase shift values are plotted against corresponding frequency bin values to form a line having an estimated slope.

FIG. 4 is an example graph in which raw phase estimates and unwrapped phase estimates are plotted against corresponding frequency bin values to form a line having an estimated slope. In the illustrated example, the unwrapped phase estimation adds 2π only to the raw phase shift estimates in the frequency range spanning from 3500 Hz to 4000 Hz. As the raw phase shift estimates in the frequency range spanning from 3500 Hz to 4000 Hz would otherwise be out of the alignment with the graphical representation of the remainder of the phase shift data, unwrapping these raw phase shift estimates allows the data to be plotted as a straight line from which a slope (e.g., $m_{P1}$) can be determined.

Returning to FIG. 3, the resulting expected slope, $m_{P1}$, for the first audio sensor pair, P1, is stored in the example slope storage 220 for subsequent use in identifying whether later-captured audio signals include wearer-generated speech. In a similar fashion, expected slope values ($m_{P2}$, $m_{P3}$, $m_{P4}$, $m_{P5}$, $m_{P6}$) are determined for each of the remaining audio sensor pairs (P2, P3, P4, P5, and P6) and stored in the slope storage 220 for use in determining whether later-captured audio signals include wearer-generated speech.

To analyze the audio signals captured by the remaining audio sensor pairs (P2, P3, P4, P5, and P6), the speech analysis manager 120 may include any number of additional sets of audio frequency analyzers and frequency bin selectors and/or the first and second audio frequency analyzers 206, 208 and the frame/bin selector 212 may be configured to operate on the audio signals collected by all of the audio sensor pairs. Further, although the illustrated example of the speech analysis manager 120 includes first and second audio samplers 206, 208, to sample the audio signals captured at the first and second audio sensors 112a, 112B, respectively, the speech analysis manager 120 may instead include a single audio sampler configured to perform the actions performed by both the first and the second audio samplers 202, 204. Likewise, the speech analysis manger 120 can include more or fewer audio frequency analyzers, than the first and second audio frequency analyzers 206, 208. Additionally, although the example implementation of the example wearable electronic device 110 of FIG. 2 includes four audio sensors (e.g., the example first audio sensor 112A, the example second audio sensor 112B, the example third audio sensor 112C, and the example fourth audio sensor 112D), the wearable electronic device 110 may include any number of audio sensors.

Referring still to FIG. 3, in some examples, when operating to determine whether a second/ambient audio signal captured at any of the audio sensor pairs (P1, P2, P3, P4, P5, P6) includes speech generated by the example wearer 100 of the example wearable electronic device 110, the second/ambient audio signal collected by the corresponding audio sensor pairs (P1, P2, P3, P4, P5, P6) is analyzed in 200 ms chunks. In some such examples, the example audio sampler 202 segments the second audio signal into the 200 ms chunks and divides each 200 ms chunk of audio into overlapping frames of 16 ms duration. The example first and second frequency analyzers 206, 208 analyze the overlapping 16 ms frames using, for example, a short term fast Fourier transform (STFT). In some examples, a 256 point STFT is employed resulting in a total of 128 frequency bins ranging from 0 Hz to 8000 Hz. As described above, the results of the STFT include, for each frame, a phase value corresponding to each of a set of frequency bins, and an energy value corresponding to each of the set of frequency bins. The information resulting from the STFT performed on the audio collected at the first audio sensor 112A of the first audio sensor pair P1 is stored in the first storage 210A and the information resulting from performing the STFT on the audio collected at the second audio sensor 112B is stored in the second storage 210B.

In some examples, the example frame/bin selector 212 evaluates the information resulting from the STFT operations corresponding to the current chunk of audio and a preceding chunk of audio to estimate for each bin, the signal to noise ratio ("SNR") corresponding to each frequency bin and selects a subset of the bins meeting a threshold level SNR. In some examples, instead of using the measured phase values corresponding to all of the frequency bins to make a determination as to whether the ambient/second audio signal includes wearer-generated speech, the example phase calculator 214 uses only the frequency bins most likely to include wearer-generated speech. In some such examples, the frame/bin selector 212 evaluates the STFT data based on the audio collected from one of the audio sensors designated as a primary audio sensor. For example, an audio sensor positioned closest to the mouth of the wearer 100 of the example wearable electronic device 110 (e.g., the first audio sensor 112A) can be designated as the primary audio sensor (e.g., the audio sensor most likely to capture the wearer-generated speech signal), when such wearer-generated speech signal is included in the ambient/second audio signal.

In some such examples, the STFT data generated using audio collected at the primary audio sensor is analyzed to identify a subset of the frequency bins having the highest SNR values (e.g., 15 of the 128 frequency bins having the highest SNR values are identified). The selected frequency bins are referred to herein as the active frequency bins for the corresponding chunk of audio. In some examples, the frame/bin selector 212 determines the SNR values for the frequency bins of the chunk of audio by comparing the energy values corresponding to a current chunk of audio with the energy values corresponding to a preceding chunk of audio (e.g., a chunk of audio collected in the 200 ms timeslot before the 200 ms timeslot in which the current chunk of audio was collected). The frame/bin selector 212 transmits information identifying the active frequency bins to the phase calculator 214 which calculates the mean phase values corresponding to the active frequency bins for the audio sensor pair (e.g., P1) and supplies this information to the example phase shift determiner 216.

In some examples, the example phase shift determiner 216 uses the mean phase values to calculate a phase shift value for each of the active frequency bins by subtracting mean phase values of the audio collected at a first of the audio sensors (e.g., the first audio sensor) and corresponding to first frequency bin from mean phase values of the audio collected at a second of the audio sensors (e.g., the second audio sensor) and corresponding to the same frequency bin. The phase shift determiner 216 supplies information identifying the active frequency bins, and the corresponding phase shift values as well as an estimated slope value (e.g., $m_{P1}$, retrieved from the slope storage 220) to the example speaker identifier 126 (see FIG. 2).

Figure 5:
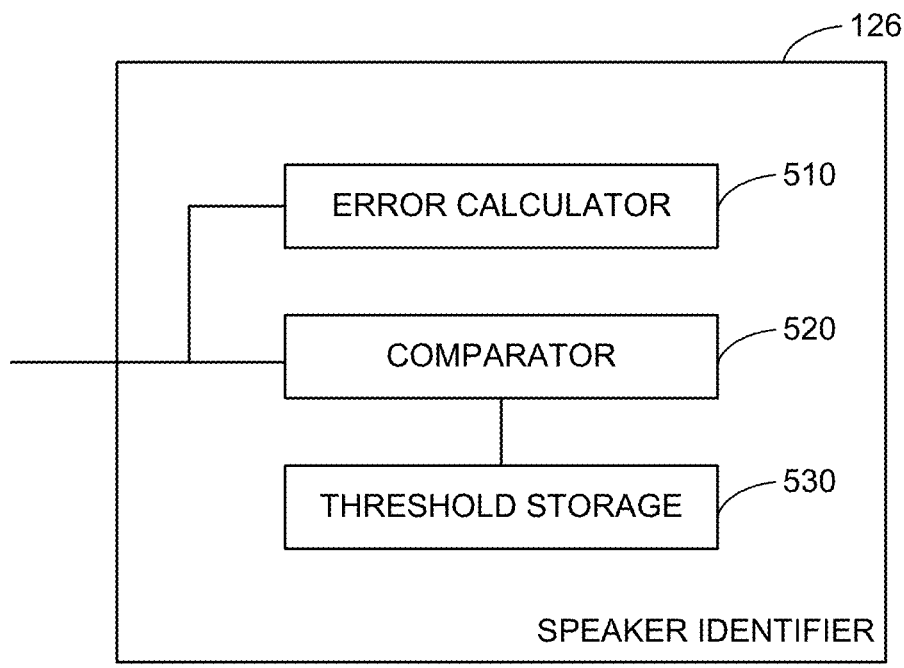
FIG. 5 is a block diagram of an example implementation of an example speaker identifier of the example speech analysis manager of FIG. 2.
Figure 6C:
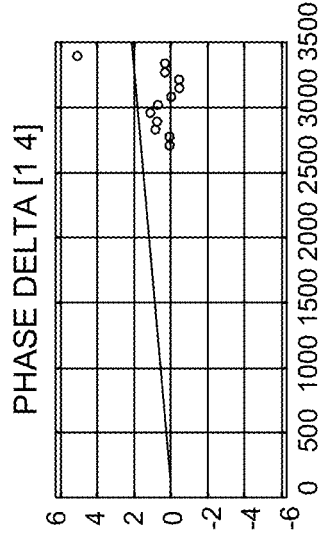
FIGS. 6A, 6B, 6C, 6D, 6E and 6F are graphs of expected slope values and measured phase shift data plotted against corresponding frequency bin values based on audio signals captured by the first, second, third, fourth, fifth and sixth audio sensor pairs, respectively.
Figure 6F:
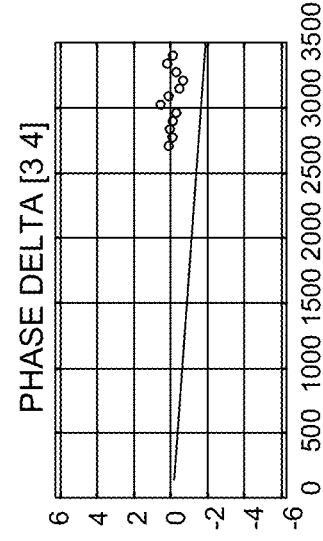
Figure 6B:
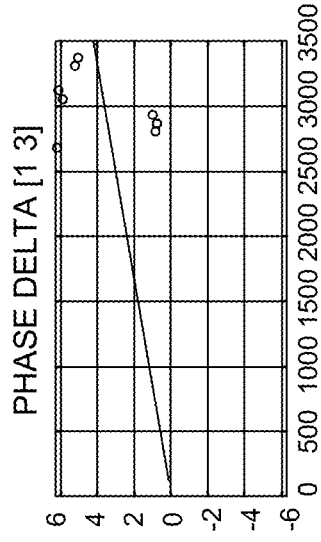
Figure 6E:
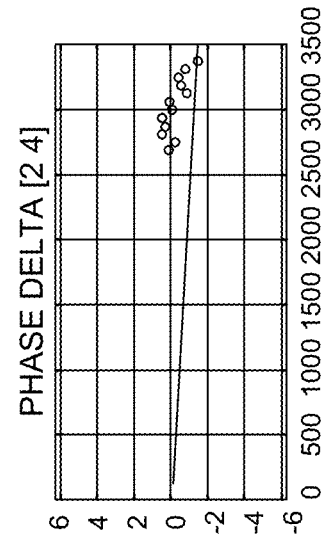
Figure 6A:
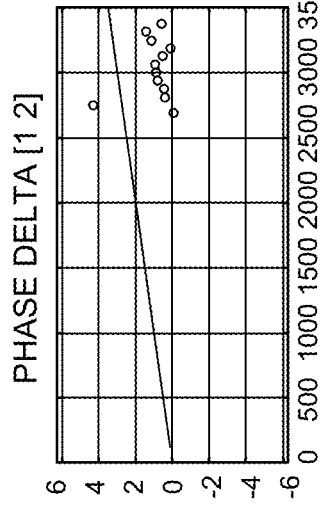
Figure 6D:
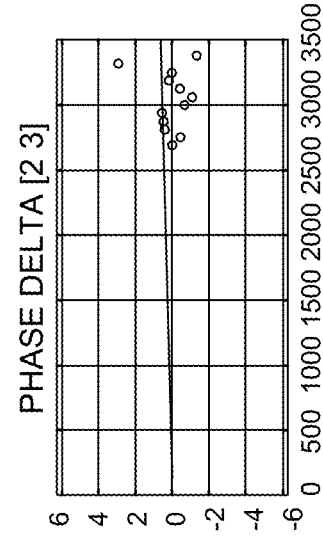

FIG. 5 is a block diagram of an example implementation of an example speaker identifier 126 of the example speech analysis manager 120 of FIG. 2. In some examples, the speaker identifier 126 includes an example error/mismatch calculator 510, an example comparator 520, and a threshold value storage 530. The error calculator 510 determines a level of error/mismatch between the mean phase shift values (also referred to as the measured phase shift values) corresponding to the active frequency bins (e.g., the 15 selected frequency bins having the highest SNR values) and the expected mean phase shift values corresponding to the same selected frequencies. As described above, the expected mean phase shift values are derivable from the estimated slope value (e.g., $m_{P1}$). In some examples, the error/mismatch calculator 510 determines an amount of mismatch between the measured phase shift values and the expected phase shift values by determining an amount of error between the measured mean phase shift values ($\Delta_{i,j}^{f}$) and the expected mean phase shift values ($m_{i,j} \times f$) as illustrated in Equation 4, below.

$$Err = \frac{1}{\pi |\{ij\}||F|} \sum_{i,j=\{i,j\}} \sum_{f=F} |\Delta_{i,j}^{f} - m_{i,j}f|_{\pm \pi} \quad \text{Equation 4}$$

In Equation 4, "F" represents the frequencies of the active frequency bins (e.g., $F=\{f_1, f_2, f_P\}$). The modulus operator "$|\Delta_{i,j}^{f}-m_{i,j}f|_{\pm\pi}$" (of Equation 4) indicates that the phase mismatch $\Delta_{i,j}^{f}-m_{i,j}f$ is to be mapped to the range $[-\pi, \pi)$ (e.g., unwrapped) before the modulus is computed. As illustrated in Equation 4, the resulting match (or mismatch) is also normalized with respect to the number of audio sensor pairs being evaluated, the frequency bins being evaluated (e.g., the active frequency bins), and the maximum possible variation.

FIGS. 6A, 6B, 6C, 6D, 6E, and 6F are graphs of expected phase shift data (illustrated using black line) corresponding to the frequency bins and determined using data collected at each of the first, second, third, fourth, fifth and sixth audio sensor pairs, respectively. FIGS. 6A, 6B, 6C, 6D, 6E, and 6F also include measured phase shift data (circles) corresponding to the 15 active frequency bins and collected at each of the first, second, third, fourth, fifth and sixth audio sensor pairs, respectively. In the illustrated examples of FIGS. 6A, 6B, 6C, 6D, 6E and 6F, there is a visually detectable degree of alignment between the measured phase shift values and the expected phase shift values.

In some examples, the example error/mismatch calculator 510 supplies the resulting error value, "Err," to the example comparator 420 which compares the error value, "Err," to a threshold value (e.g., 0.1). In some examples, when "Err" exceeds the threshold value, the chunk of audio contains wearer-generated speech and when "Err" does not exceed the threshold value, the chunk of audio does not contain wearer-generated speech. In some examples, the comparator 420 compares "Err" to a set of threshold values (e.g., a first threshold value of 0.1 and a second threshold value of 0.3). In some such examples, when "Err" is less than the first threshold value, the chunk of audio contains wearer-generated speech and when "Err" is equal to or greater than the first threshold value and also less than the second threshold value, the source of the chunk of audio is undetermined. Further, when "Err" is equal to or exceeds the second threshold value, the chunk of audio is determined to not contain wearer-generated speech.

Figure 7:
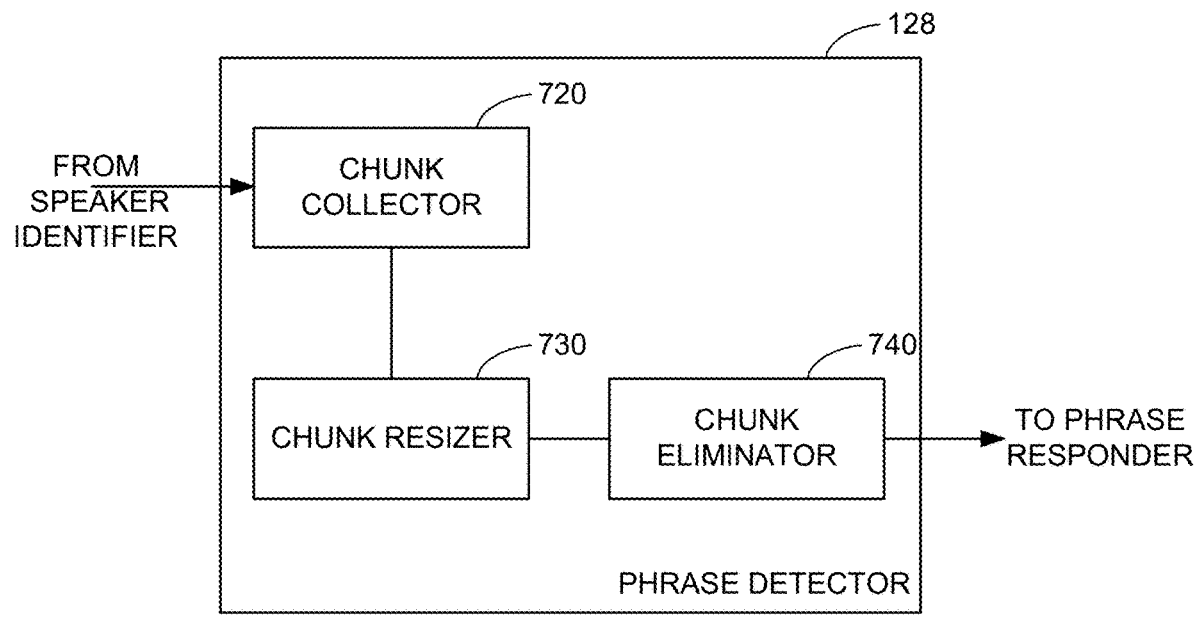
FIG. 7 is a block diagram of an example implementation of an example phrase detector of the example speech analysis manager of FIG. 2.

FIG. 7 is a block diagram of an example implementation of an example phrase detector 128 of the example speech analysis manager 120 of FIG. 2. In some examples, the phrase detector 128 includes an example chunk collector 720, an example chunk lengthener 730, an example chunk eliminator 740. The example speaker identifier 126 supplies chunks of analyzed audio to the example chunk collector 720 with information indicating which of the chunks have been determined to include wearer-generated speech and indicating which of the chunks have been determined not to include wearer-generated speech. In some examples, the chunk lengthener 730 resizes the chunks of audio that include wearer-generated speech and that are positioned next to chunks not including wearer-generated speech. The resizing is performed by incorporating a portion of the audio captured before and, in some cases, after the chunk of audio (e.g., by incorporating portions of the neighboring chunks that do not include wearer-generated speech). Lengthening the chunks of wearer-generated speech to include portions of the neighboring chunks that don't include wearer-generated speech helps to ensure that the start and the end of the wearer-generated speech are properly captured for inclusion in the phrase. In some examples, the chunk eliminator 740 replaces the chunks of audio not including wearer-generated speech with silence.

FIGS. 8A, 8B, 8C, 8D, and 8E illustrate audio waveforms containing different content and presented in various formats. FIG. 8A illustrates a first audio waveform of wearer-generated speech. FIG. 8B illustrates a second audio waveform of third party (non wearer-generated) speech. FIG. 8C illustrates a third audio waveform captured at the primary audio sensor (e.g., the first audio sensor 112A) when exposed to the audio signal represented in the first audio waveform and the audio signal represented by the second audio waveform, simultaneously. FIG. 8C includes the portions of the audio signal having a SNR greater than 5 dB. As described above, the frequency bins at the primary audio sensor having a SNR greater than a threshold value (e.g., 5 dB, 10 dB, etc.) can be selected by the example frame/bin selector 212 as the active frequencies for which mean phase values will be generated by the example phase calculator 214.

FIG. 8D illustrates the results of analyzing an audio signal captured at an audio sensor pair (e.g., any of P1, P2, P3, P4, P5 and P6) when the audio sensor pair is exposed to the audio signal represented in the first audio waveform and the audio signal represented by the second audio waveform, simultaneously. The waveform of FIG. 8D has been analyzed in 200 ms chunks and the chunks of the audio signal that include consecutive portions that exceed the zero value on the vertical access represent the audio chunks most likely to contain wearer-generated speech. Although, in the description above, wearer-generated speech is identified by the example speaker identifier 126 when the amount of mismatch (e.g., Err) between measured phase shift values and expected phase shift values is less than a threshold amount, the graphical depiction of the waveform of FIG. 8D instead illustrates the amount of match (1−Err) between the measured phase shift values and the ambient audio captured at the audio sensor pair. Thus, FIG. 8D illustrates the likelihood that the captured ambient signal includes wearer-generated speech wherein a greater likelihood, corresponds to portions/chunks of the audio having a larger amplitude (e.g., larger than zero on the vertical axis).

FIG. 8E represents the audio waveform of FIG. 8D after having been analyzed by example phrase detector 128. As illustrated, the chunks corresponding to audio containing wearer-generated speech have been lengthened to include portions of the neighboring chunks that do not contain wearer-generated speech. Further the chunks of the audio that do not contain wearer-generated speech have been eliminated or zeroed out to prevent the example phrase responder 130 from attempting to respond to such chunks.

Referring again to FIG. 2, the example phrase detector 128 supplies the resulting signal, (e.g., a signal including the elongated chunks of audio having speech generated by the wearer of the electronic device and excluding the remaining chunks of audio) to the example phrase responder 130. The phrase responder 130 uses a variety of techniques (e.g., speech processing, speech parsing, etc.) to identify the content of the phrase included in the resulting signal and to prepare an appropriate response to the content. The response can include the performance of any of a variety of actions including generation of a search, generation of a message (e.g., text, email, etc.), instructing a recording device via the example recording device input 136 (e.g., a camera, a video recording device an audio recording device, etc.), to make a recording, instructing a display 134 of the example wearable electronic device 110 to present information, etc.

The wearable electronic device illustrated in FIG. 1 includes four audio sensors that are used to form six audio sensor pairs. In practice, a wearable electronic device having a greater or lesser number of sensors can be used to identify speech generated by a wearer of the wearable electronic device in the manner disclosed herein.

While an example manner of implementing the speech analysis manager 120 and the wearable electronic device 110 are illustrated in FIG. 1, FIG. 2, FIG. 3, FIG. 5, and FIG. 7 one or more of the elements, processes and/or devices illustrated in FIG. 1, FIG. 2, FIG. 3, FIG. 5, and FIG. 7 may be combined, divided, re-arranged, omitted, eliminated and/or implemented in any other way. Further, the example audio analyzer 122, the example slope determiner 124, the example speaker identifier 126, the example phrase detector 128, the example phrase responder 130, the example speech analysis manager storage 132, the example display output 134, the example recording device input 136, the example first audio sampler 202, the example second audio sampler 204, the example first frequency analyzer 206, the example second frequency analyzer 208, the example first storage 210A, the example second storage 210B, the example frame/bin selector 212, the example phase calculator 214, the example phase shift determiner 216, the example slope estimator 218, the example slope storage 220, the example error calculator 510, the example comparator 520, the example threshold storage 530, the example chunk collector 720, the example chunk resizer 730, the example chunk eliminator 740 and/or more generally the example speech analysis manager 120 of FIG. 1 and FIG. 2 and the wearable electronic device 110 may be implemented by hardware, software, firmware and/or any combination of hardware, software and/or firmware. Thus, for example, any of the example audio analyzer 122, the example slope determiner 124, the example speaker identifier 126, the example phrase detector 128, the example phrase responder 130, the example speech analysis manager storage 132, the example display input 134, the example recording device input 136, the example first audio sampler 202, the example second audio sampler 204, the example first frequency analyzer 206, the example second frequency analyzer 208, the example first storage 210A, the example second storage 210B, the example frame/bin selector 212, the example phase calculator 214, the example phase shift determiner 216, the example slope estimator 218, the example slope storage 220, the example error calculator 510, the example comparator 520, the example threshold storage 530, the example chunk collector 720, the example chunk resizer 730, the example chunk eliminator 740 and/or more generally the example speech analysis manager 120 of FIG. 1 and FIG. 2 and the wearable electronic device 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example the example audio analyzer 122, the example slope determiner 124, the example speaker identifier 126, the example phrase detector 128, the example phrase responder 130, the example speech analysis manager storage 132, the example display output 134, the example recording device input 136, the example first audio sampler 202, the example second audio sampler 204, the example first frequency analyzer 206, the example second frequency analyzer 208, the example first storage 210A, the example second storage 210B, the example frame/bin selector 212, the example phase calculator 214, the example phase shift determiner 216, the example slope estimator 218, the example slope storage 220, the example error calculator 510, the example comparator 520, the example threshold storage 530, the example chunk collector 720, the example chunk resizer 730, the example chunk eliminator 740, the example speech analysis manager 120, and the wearable electronic device 110 is/are hereby expressly defined to include a tangible computer readable storage device or storage disk such as a memory, a digital versatile disk (DVD), a compact disk (CD), a Blu-ray disk, etc. storing the software and/or firmware. Further still, the example wearable electronic device 110 of FIG. 1 and the example speech analysis manager 120 of FIG. 1 and FIG. 2 may include one or more elements, processes and/or devices in addition to, or instead of, those illustrated in FIG. 1, FIG. 2, FIG. 3, FIG. 5, and FIG. 7 and/or may include more than one of any or all of the illustrated elements, processes and devices.

Figure 9:
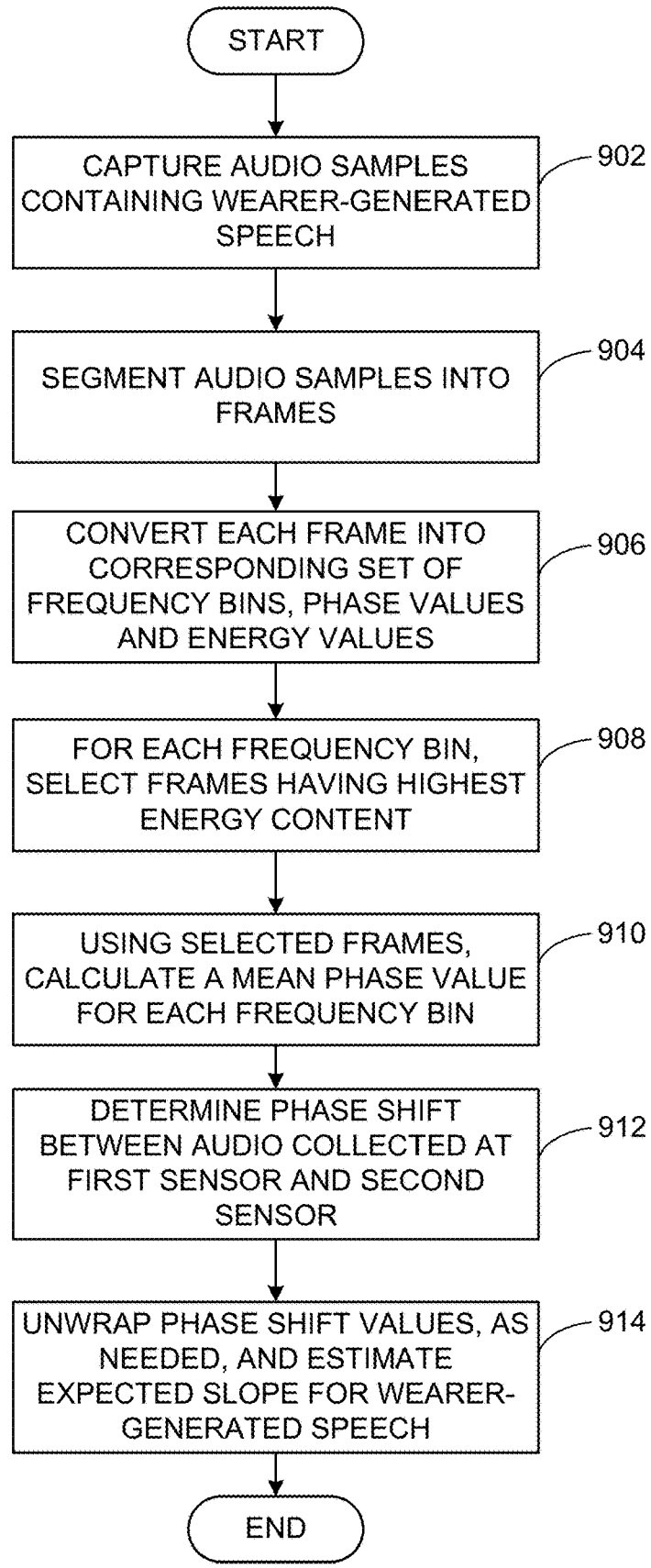
FIG. 9 is a flow chart representative of example machine readable instructions which may be executed to implement the example speech analysis manager of FIG. 1 and FIG. 2.
Figure 10A:
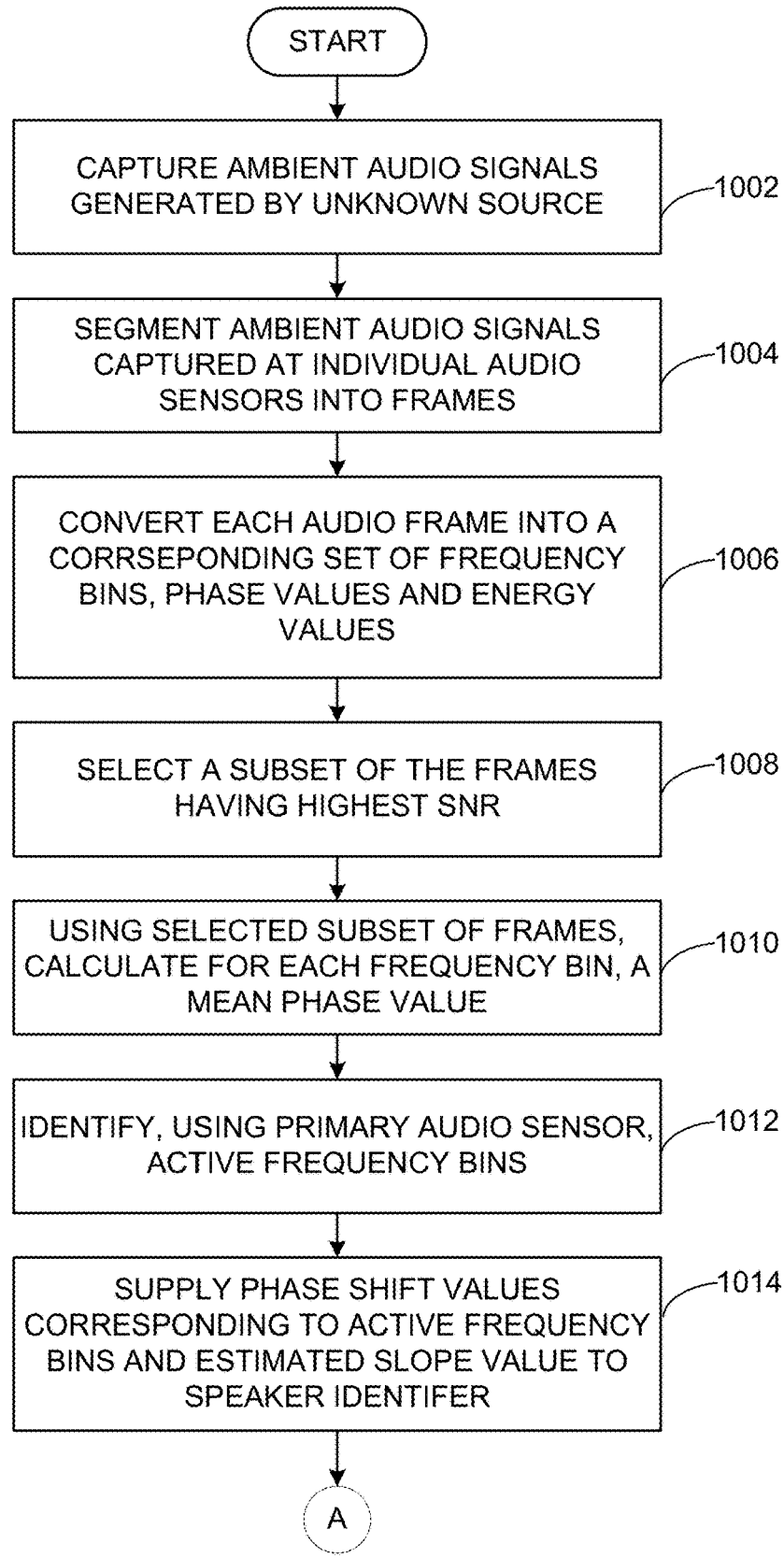
FIGS. 10A and 10B depict a flow chart representative of example machine readable instructions which may be executed to implement the example speech analysis manager of FIG. 1 and FIG. 2.
Figure 10B:
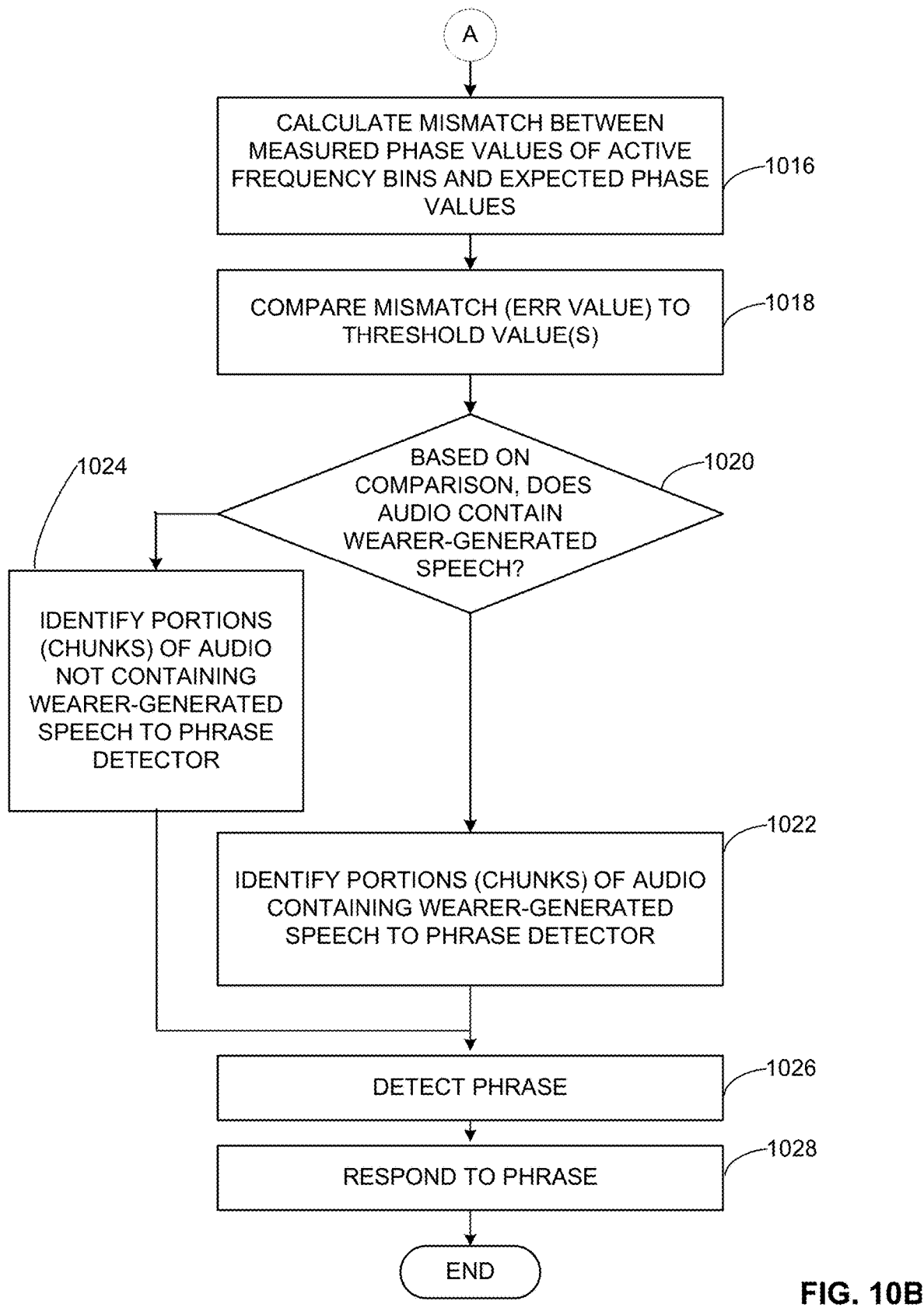

Flowcharts representative of example machine readable instructions for implementing the example speech analysis manager 120 of FIG. 1 and FIG. 2 is shown in FIGS. 9, 10A and 10B. In these examples, the machine readable instructions comprise a program(s) for execution by a processor such as the processor 1112 shown in the example processor platform 1100 discussed below in connection with FIG. 11. The program(s) may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 9, 10A and 10B, many other methods of implementing the example speech analysis manager 120 of FIG. 1 and FIG. 2 may alternatively be used. For example, the order of execution of the blocks may be changed, and/or some of the blocks described may be changed, eliminated, or combined.

As mentioned above, the example processes of FIGS. 9, 10A, and 10B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably.

Additionally or alternatively, the example processes of FIGS. 9, 10A, and 10B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

The program 900 of FIG. 9 provides example operations performed by the example speech analysis manager 120 of FIG. 1 and FIG. 2 and begins at block 902 at which the example audio sensor pairs (P1, P2, P3, P4, P5, P6) (see FIG. 1) capture ambient audio. As the captured audio will be used to determine an expected slope value, the captured audio includes wearer-generated speech. The example audio samplers 202, 204 segment the audio streams captured at the audio sensor pairs into sets of frames (block 904). In some examples, the captured audio is segmented into 16 ms frames with 8 ms overlap between neighboring frames. Numbering of the frames of audio is represented herein using the index n=1, 2, . . . , N.

Example audio frequency analyzers 206, 208 perform a fast Fourier transform operation on each frame included in the sets of audio frames (block 906). In some examples, the audio frequency analyzers 206, 208 analyze the sets of frames, respectively, using, for example, a special type of fast Fourier transform called a short term fast Fourier transform ("STFT"). Performing the STFT operation on each frame in the sets of audio frames, results in a set of pulses (corresponding to each frame in a set of frames) residing in frequency bins. The numbering of the frequency bins is represented herein using the index f=1, 2, . . . , $N_{FFT}/2$. Further, the magnitude of each of the pulses represents the energy of the signal at that frequency. In addition, the results of the STFT performed on each frame yield a phase angle ($\psi$) corresponding to each frequency bin, f. In some examples, the information derived by the first frequency analyzer 206 from the audio signal supplied by the output of the first audio sensor 112A (e.g., n sets of frequency bins, f, each frequency bin associated with a corresponding phase angle ($\psi$) and corresponding energy value) is stored in the first storage 210A. The information derived by the second frequency analyzer 208 from the audio signal supplied by the output of the second audio sensor 112B (e.g., n sets of frequency bins, f each frequency bin associated with a corresponding phase angle ($\psi$) and corresponding energy value) is stored in the second storage 210B.

The example frame/bin selector 212 accesses the frequency information generated by the example first and second audio frequency analyzers 206, 208 and identifies, for each frequency bin, f, a fraction of the frames (e.g., 20% of the frames) having a high energy content (block 908). In some examples, the frame/bin selector 212 uses the energy information to evaluate the amount of signal included in the frequency bins relative to the amount of noise included in the frequency bins and selects a subset of the frames meeting a threshold signal to noise ratio ("SNR") criteria. Due to the sparse nature of speech signals in both the time and the frequency domains, the subset of frames selected in a first of the frequency bins (e.g., f=1) may not be (and likely will not be) the same frames selected for analysis in a second of the frequency bins (e.g., f=2). Information identifying the selected frames is supplied to the example phase calculator 214. The example phase calculator 214 determines a mean phase value for each frequency bin, f, using the phase angles corresponding to the selected frames (block 910). Selecting the frames having the highest energy values for each frequency bin, f, and using the phase angles corresponding to the selected frames to calculate a mean phase value for each frequency bin, f, promotes inclusion of the portions of the audio signal contributed by speech and exclusion of the portions of the audio signal contributed by background noise. Thus, the phase calculator 214 generates a first set of mean phase values (one corresponding to each frequency bin) representing the audio information collected at the first audio sensor 112A and a second set of mean phase values (one corresponding to each frequency bin) representing the audio information collected at the second audio sensor 112B.

The example phase shift determiner 216 determines the phase shift associated with each frequency bin by subtracting corresponding ones of the first set of mean phase values from corresponding ones of the second set of mean phase values, as described in Equation 2 above (block 912).

At the example slope estimator 218, a curve fitting technique is applied to estimate an expected slope, $m_{P1}$, for the first audio sensor pair, P1, and a phase unwrapping technique is used to unwrap the raw phase shift values calculated by the example phase shift determiner 216 (block 914). The curve fitting technique can be any technique that seeks to find a minimum distance between a slope $m_i$ associated with the first audio sensor 112A and a slope $m_j$ associated with the second audio sensor 112B. The raw phase shift estimates wrap around [$\pi$, $-\pi$) thereby making a straight line representation of the raw phase shift data impossible. Unwrapping the raw phase shift values involves adding multiples of $2\pi$ (to the raw phase shift values, as needed to allow the formation of a straight line when plotting the raw phase shift values against the frequency bin values. In other words, for wrapped phase shift angles between $-\pi$ and $\pi$ (e.g., $\Delta \in (-\pi, \pi]$) and an unwrap bias b, the unwrapped phase shift angle ($U_b(\Delta)$) is defined as $\Delta$ added to a unique integer multiple of $2\pi$ ((say n) such that $\Delta + 2\pi n \in (b-\pi, b-\pi]$. As a result of the unwrapping operation, the unwrapped phase shift angle lies within (b$-\pi$, b$+\pi$). The expected slope estimation and unwrapping operation can be represented as a joint operation as shown in Equation 3, above.

As stated above, in Equation 3, the unwrapped phased shift is calculated by adding multiples of $2\pi$ (to the raw (wrapped) phase shift value ($U_b(\Delta)=+2\pi k$) to cause the unwrapped phase shift to have a value within (b–$\pi$, b+$\pi$) (e.g., $U_b(\Delta) \in (b-\pi, b+\pi]$). The unwrapping operation need only be performed on the wrapped phase shift values that, absent unwrapping, will lie outside of the range (b–$\pi$, b+$\pi$). The slope value $m_{i,j}$ where i=1 and j=2 corresponds to the slope value for the first audio sensor pair, P1, (e.g., $m_{P1}$) and is stored by the example slope estimator 218 in the example slope storage 220. Although the operations of FIG. 9 are described with respect to calculating the slope value for the first audio sensor pair, P1, it should be understood that the operations are likewise performed on audio collected by the remaining sensor pairs, P2, P3, P4, P5, P6 such that at the end of the method 900, the slope values $m_{P2}$, $m_{P3}$, $m_{P4}$, $m_{P5}$, and $m_{P6}$ are also determined and stored in the slope storage 220.

The program 1000 of FIGS. 10A and 10B provides example operations performed by the example speech analysis manager of FIG. 1 and FIG. 2 and begins at block 1002 at which the example audio sensors pairs, P1, P2, P3, P4, P5, P6 capture ambient audio which may or may not include wearer-generated speech. As described below, the speech analysis manager 120 analyzes the captured ambient audio to determine whether the ambient audio includes wearer-generated speech. In some examples, when operating to determine whether the captured ambient audio contains wearer-generated speech, the example audio sampler 202 segments the ambient audio signal collected at the first audio sensor 112A into 200 ms chunks and divides each 200 ms chunk of audio into overlapping frames of 16 ms duration (block 1004). Likewise, the example audio sampler 204 segments the ambient audio signal collected at the second audio sensor 112B into 200 ms chunks and divides each 200 ms chunk of audio into overlapping frames of 16 ms duration (also block 1004). The example first and second frequency analyzers 206, 208 analyze the overlapping 16 ms frames using generated at the first and second audio sampler, respectively, using for example, a short term fast Fourier transform (STFT) (block 1006). In some examples, a 256 point STFT is employed resulting in a total of 128 frequency bands ranging from 0 Hz to 8000 Hz. As described above, the results of the STFTs include, for each frame, a phase value corresponding to each of a set of frequency bins, and an energy value corresponding to each of the set of frequency bins. The information resulting from the STFT performed on the audio collected at the first audio sensor 112A of the first audio sensor pair P1 is stored in the first storage 210A and the information resulting from performing the STFT on the audio collected at the second audio sensor 112B of the first audio sensor pair P1 is stored in the second storage 210B (also at block 1006). In some examples, the frame/bin selector 212 evaluates the information resulting from the STFTs corresponding to the current chunk of audio and the preceding chunk of audio to estimate for each frame, the SNR corresponding to each frequency bin and selects a subset of the frames that meet a threshold level SNR (block 1008), say 5 dB. In some such examples, information identifying the selected subset of frames is supplied to the example phase calculator 214.

The example phase calculator 214 uses the selected subset of frames corresponding to each frequency bin to calculate a mean phase value for each frequency bin (block 1010). The example phase shift determiner 216 uses the mean phase information calculated by the phase calculator 214 to determine the measured phase shift between the ambient audio collected at the first audio sensor 112A and the ambient audio collected at the second audio sensor 112B. The phase shift can be determined by subtracting the mean phase value corresponding to a frequency bin for the ambient audio collected at the first audio sensor 112A from the mean phase value corresponding to the same frequency bin for the ambient audio collected at the second audio sensor 112B.

In some examples, instead of using the measured phase shift values corresponding to all of the frequency bins to make a determination as to whether the ambient audio signal includes wearer-generated speech, only the frequency bins most likely to include wearer-generated speech are used. In some such examples, the example frame/bin selector 212 evaluates the STFT audio data based on the audio collected from one of the audio sensors designated as a primary audio sensor (block 1012). For example, an audio sensor positioned closest to the mouth of the wearer of the wearable electronic device 110 (e.g., the first audio sensor 112A) can be designated as the primary audio sensor as being the most likely of the audio sensors to capture the strongest speech signal (compared to noise signal), if any, generated by the wearer.

In some such examples, the example frequency analyzer 206 analyzes the STFT data generated from the ambient audio collected at the primary audio sensor to identify a subset of the frequency bins having the highest SNR values (e.g., 15 of the 128 frequency bins having the highest SNR values are identified) (also at the block 1012). The selected frequency bins are referred to herein as the active frequency bins for the corresponding chunk of audio. In some examples, the example frame/bin selector 212 determines the SNR values for the chunk of audio by comparing the energy values corresponding to a current chunk of audio with the energy values corresponding to a preceding chunk of audio (e.g., a chunk of audio collected in the 200 ms timeslot before the 200 ms timeslot in which the current chunk of audio was collected). The frame/bin selector 212 transmits information identifying the active frequency bins to the example slope calculator 218.

In some examples, the example slope calculator 218 identifies the measured phase shift values corresponding to the active frequency bins and supplies this information along with the estimated slope (stored in the example slope storage 220) of the audio sensor pair (e.g., P1) from which the ambient audio was collected to the example speaker identifier 126 (block 1014). The example error calculator 510 (see FIG. 5) of the speaker identifier 126 determines a level of mismatch between the measured phase shift values corresponding to the active frequency bins and the expected phase shift values corresponding to the same selected frequencies (block 1016). As described above, the expected phase shift values are derivable from the estimated slope (e.g., $m_{P1}$). In some examples, the error calculator 510 determines an amount of mismatch between the measured phase shift values ($\Delta_{i,j}^{f}$) and the expected phase shift values ($m_{i,j} \times f$) in accordance with Equation 4, above.

In some examples, the example error calculator 510 supplies the resulting error/mismatch value, "Err," to the example comparator 520 which compares the error value "Err" to one or more threshold values (e.g., 0.1) (block 1018). Based on the comparison, the speaker identifier 126 determines whether the corresponding audio chunk contains wearer-generated speech (block 1020). In some examples, when "Err" exceeds the threshold value, the corresponding chunk of audio does not contain speech generated by the wearer (block 1022) and when "Err" does not exceed the threshold value, the chunk of audio is determined to contain speech generated by the wearer (block 1024). In some examples, the comparator compares "Err" to a set of threshold values (e.g., a first threshold value of 0.1 and a second threshold value of 0.3). In some such examples, when "Err" is less than the first threshold value, the chunk of audio contains speech generated by the wearer (also block 1022) and when "Err" is equal to or greater than the first threshold value and less than the second threshold value, the source of the chunk of audio is undetermined. In some examples, the chunks determined to have an undetermined source of audio can be treated as not containing wearer-generated speech (also block 1024) and in some examples the chunks determined to have an undetermined source can be treated as containing wearer-generated speech (also block 1022). Further, when "Err" is equal to or exceeds the second threshold value, then the chunk of audio contains does not contain speech generated by the wearer (also block 1024).

In some examples, chunks of audio analyzed by the example speaker identifier 126 are supplied to the example phrase detector 128 with information identifying the chunks determined to include wearer-generated speech and identifying the chunks determined not to include wearer-generated speech. In some examples, the phrase detector 128 performs operations on the chunks of audio to enable detection of a phrase within the audio (block 1026). In some examples, the operations include resizing the chunks of audio by lengthening the chunks of audio containing wearer-generated speech as described above with respect to FIG. 5 and shortening the neighboring chunks of audio that do not include wearer-generated speech. In some examples, the phrase detector 128 also replaces the remaining portions of the audio (e.g., the chunks of audio not including wearer-generated speech) with silence (also at block 1026).

The example phrase detector 128 supplies the resulting signal, (e.g., a signal including the elongated chunks of audio including wearer-generated speech and excluding the remaining chunks of audio) to the example phrase responder 130 which uses a variety of techniques (e.g., speech processing, speech parsing, etc.) to identify the content of the phrase included in the resulting signal and to prepare an appropriate response to the content (also at block 1028). The response can include the performance of any of a variety of actions including generating a search, generating a message (e.g., text, email, etc.), instructing a camera or video device to take a picture and/or record a video or audio, causing information to be presented on a display of the wearable electronic device 110, etc. Thereafter the method 1000 ends, or, can be repeated with respect to subsequent ambient audio captured at the audio sensor pairs (P1, P2, P3, P4, P5, P6).

Figure 11:
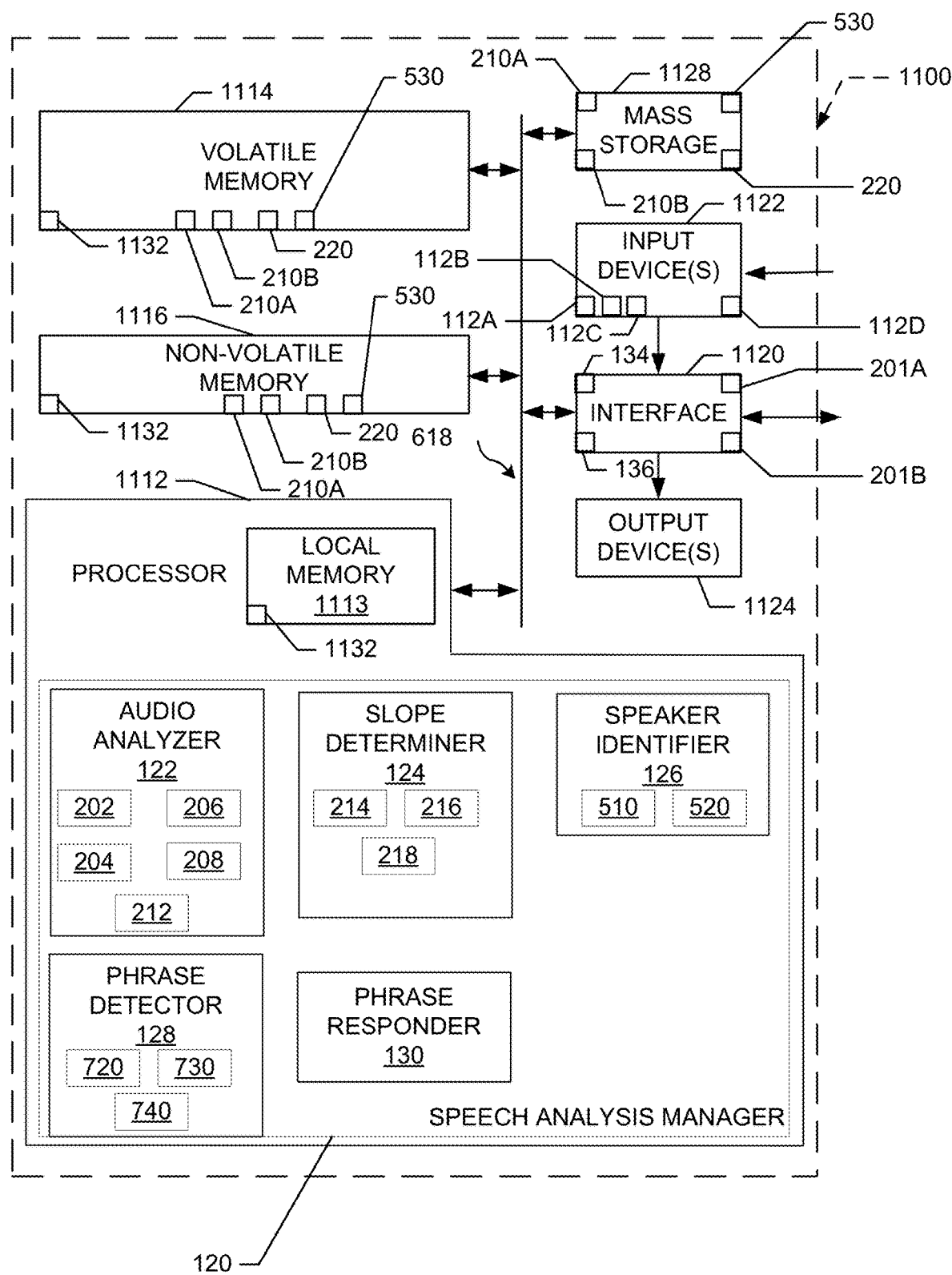
FIG. 11 is a block diagram of an example processor platform capable of executing the instructions of FIGS. 9, 10A and/or 10B to implement the example speech analysis manager of FIG. 1 and FIG. 2.

FIG. 11 is a block diagram of an example processor platform 1100 capable of executing the instructions of FIGS. 9, 10A and 10B to implement the speech analysis manager 120 of FIG. 1 and FIG. 2. The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In some examples, the processor 1112 can be used to implement the example audio analyzer 122, the example slope determiner 124, the example speaker identifier 126, the example phrase detector 128, the example phrase responder 130, the example first audio sampler 202, the example second audio sampler 204, the example first frequency analyzer 206, the example second frequency analyzer 208, the example frame/bin selector 212, the example phase calculator 214, the example phase shift determiner 216, the example slope estimator 218, the example error calculator 510, the example comparator 520, the example audio chunk collector 720, the example audio chunk resizer 730, the example audio chunk eliminator 740.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller. In some examples, the volatile memory 1114, and the non-volatile memory 1116 can be used to implement the example speech analysis manager storage device 132, the example first storage 210A, the example second storage 210B, the example slope storage 220, and the example threshold storage 530.

The processor platform 1100 of the illustrated example can also include an interface circuit 1120. The interface circuit 1120 may be implemented by any type of interface standard, such as an Ethernet interface, a universal serial bus (USB), and/or a PCI express interface. In some examples, the interface circuit can be used to implement one or more communication bus(es) connecting the components of the speech analysis manager 120, the example display output 134, the example recording device input 136, and the example phrase responder 130 and the example connections between the example first and second audio sensors 112A, 112B, and the example first and second audio samplers 202, 204.

In the illustrated example, one or more input devices 1122 are connected to the interface circuit 1120. The input devices 1122 can be implemented by the example first audio sensor 112A, the example second audio sensor 112B, the example third audio sensor 112C, and the example fourth audio sensor 112D. One or more output devices 1124 can also be connected to the interface circuit 1120 of the illustrated example. The output devices 1124 can be implemented, for example, by display devices (e.g., a light emitting diode (LED), an organic light emitting diode (OLED), and a liquid crystal display, emitting diode (LED)). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, a low power wireless area network, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives. In some examples, the mass storage device 1128 can be used to implement the example speech analysis manager storage device 132, the example first storage 210A, the example second storage 210B, the example slope storage 220, and the example threshold storage 530.

The coded instructions 1132 of FIGS. 9, 10A and 10B may be stored in the mass storage device 1128, in the volatile memory 1114, in the non-volatile memory 1116, and/or on a removable tangible computer readable storage medium such as a CD or DVD.

Example Apparatus, Methods, and Articles of Manufacture to identify a source of an audio signal are disclosed herein. Example apparatus, methods and articles of manufacture can be installed, for example, on any wearable electronic device. Example No. 1 is an audio source identifier having a first audio sensor disposed at a first location on a wearable electronic device, a second audio sensor disposed at a second location on the wearable electronic device, and a phase shift determiner to determine a phase shift between a first sample of first audio captured at the first audio sensor and a second sample of the first audio captured at the second audio sensor. The first audio signal includes first speech generated by a first person wearing the wearable electronic device. The audio source identifier also includes a speaker identifier to determine, based on the phase shift determined by the phase shift determiner, whether second audio includes second speech generated by a second person.

Example No. 2 is the audio source identifier of Example No. 1, wherein the first person and the second person are a same person.

Example No. 3 is the audio source identifier of Example No. 1, wherein the phase shift is a first phase shift and the phase shift determiner is further to determine a second phase shift between a third sample of the second audio and a fourth sample of the second audio.

Example No. 4 is the audio source identifier of Example No. 3, wherein the speaker identifier is further to determine whether the second audio includes the second speech generated by the second person based on a comparison of the first phase shift to the second phase shift.

Example No. 5 is the audio source identifier of any of Example Nos. 1, 2, 3, and 4, and further includes a phrase detector to resize first chunks of the second audio determined to include second speech generated by the second person and to eliminate second chunks of the second audio not determined to include second speech generated by the second person.

Example No. 6 is the audio source identifier of any of Example Nos. 1, 2, 3, and 4, and further includes a frame segmenter to divide the first sample into a set of frames, and a frequency analyzer to convert the frames into respective sets of signal pulses. The signal pulses occupy frequency bins. Example No. 6 also includes a selector to select, for respective frequency bins, respective subsets of the frames. In Example No. 6, the selected subsets of the frames meet a threshold signal to noise ratio criteria.

Example No. 7 is the audio source identifier of any of Example Nos. 1, 2 and 3, wherein the phase shift determiner is to calculate a plurality of phase shifts between the first sample and the second sample at respective frequencies, and plot the plurality of phase shifts against the respective frequencies. In Example No. 7, the phase shift determiner is further to identify a slope of a line representing an expected change in phase shift relative to an expected change in frequency.

Example No. 8 is the audio source identifier of any of Example Nos. 1, 2, and 3, wherein the speaker identifier is to determine whether the second audio includes speech generated by the second speaker by unwrapping a phase shift determined by the phase shift determiner.

Example No. 9 is the audio source identifier of Example No. 8, and further includes a slope estimator to estimate the slope of a line formed by plotting a plurality of phase shifts, including the unwrapped phase shift, against corresponding frequencies.

Example No. 10 is a method to determine a source of speech. The method of Example No. 10 includes collecting, at a first microphone, a first sample of a first audio, and collecting, at a second microphone, a second sample of the first audio signal. In Example No. 10, the first microphone is disposed at a first location on a wearable electronic device and the second microphone is disposed at a second location on the wearable electronic device. The method of Example No. 10 also includes determining a phase shift between the first sample and the second sample. The first and second samples are different samples of the first audio and the first audio includes first speech generated by a first speaker wearing the wearable electronic device. The method of Example No. 10 also includes determining, based on the phase shift, whether second audio captured at the first and second microphones includes second speech generated by a second speaker. In example No. 10, the second speaker is any speaker wearing the wearable electronic device.

Example No. 11 is the method of Example No. 10, wherein the first speaker and the second speaker are a same speaker.

Example No. 12 is the method of Example No. 10, wherein the phase shift is a first phase shift. The method of Example No. 12 also includes determining a second phase shift between a third sample of the second audio captured at the first microphone and a fourth sample of the second audio captured at the second audio sensor.

Example No. 13 is the method of any of Example Nos. 10, 11, and 12, wherein the determining of whether the second audio signal includes second speech generated by the second speaker wearing the wearable electronic device includes comparing the first phase shift to the second phase shift.

Example No. 14 is the method of any of Example Nos. 10, 11 and 12 and further includes resizing first chunks of the second audio. In the method of Example No. 14, the first chunks are chunks that have been determined to include speech generated by the second speaker. The method of Example No. 14 also includes removing second chunks of the second audio. In the method of Example No. 14, the second chunks have been determined not to include second speech generated by the second speaker.

Example No. 15 is the method of any of Example Nos. 10, 11, and 12 and additionally includes segmenting the first sample of the first audio signal into a set of frames, and converting the portions of the first sample included in the set of frames into respective sets of signal pulses. In the method of Example No. 15, the signal pulses occupy frequency bins. The method of Example No. 15 also includes selecting, for respective frequency bins, respective subsets of the frames. In the method of Example No. 15, the portions of the first audio correspond to the subsets of the frames having a threshold signal to noise ratio.

Example No. 16. is the method of Example No. 15, wherein the determining of the phase shift includes determining a first phase angle of the first sample of the first audio signal at a first frequency corresponding to a first frequency bin. In the method of Example No. 16, the first phase angle is calculated based on the portions of the first sample corresponding to a first selected subset of the frames for the first frequency bin. The method of Example No. 16 also includes determining a second phase angle of the second sample of the first audio signal at the first frequency, the second phase angle calculated based on the portions of the second sample corresponding to the first selected subset of the frames for the first frequency bin.

Example No. 17 is the method of Example No. 15 and further includes estimating a slope of a line formed by plotting changes in unwrapped phase shifts against corresponding changes in frequency.

Example No. 18 is the method of any of Example Nos. 10, 11, and 12, wherein the determining of the phase shift includes calculating a plurality of phase shifts between the first sample and the second sample at a set of selected frequencies, plotting the plurality of phase shifts against the selected frequencies, and identifying an expected change in phase shift relative to the set of selected frequencies.

Example No. 19 is the method of any of Example Nos. 10, 11, and 12, wherein the phase shift is a wrapped phase shift, and the determining of the phase shift further includes unwrapping the wrapped phase shift by adding a multiple of $2\pi$ to the wrapped phase shift.

Example No. 20 is the method of any of Example Nos. 10, 11, and 12, and further includes converting the third sample to a set of frequency bins containing pulses, and analyzing the energy contained in the set of frequency bins to identify a subset of the frequency bins. In the method of Example No. 20, a signal energy contained in the frequency bins of the subset of frequency bins meets a threshold signal to noise ratio criteria and the second phase shift is determined at a frequency corresponding to one of the subset of frequency bins.

Example No. 21 is the method of Example No. 20, wherein the determining of the second phase shift includes determining a plurality of second phase shifts. In the method of Example No. 21, the second phase shifts are determined at frequencies corresponding to the subset of frequency bins.

Example No. 22 is an apparatus including means to perform the method of any of Example Nos. 10-21.

Example No. 23 is a machine-readable storage including machine-readable instructions. When executed, the instructions of Example No. 23 cause a machine to implement a method or realize an apparatus as described in any of Example Nos. 10-21.

Example No. 24 is a tangible machine readable storage medium having instructions. The instructions of Example No. 24, when executed, cause a machine to at least determine a phase shift between a first sample of first audio collected at a first audio sensor and a second sample of the first audio collected at a second audio sensor. In Example No. 24, the first and second audio sensors are disposed at different locations on a wearable electronic device, and the first audio signal includes first speech generated by a first speaker wearing the wearable electronic device. The instructions of Example 24 also cause the machine to determine, based on the phase shift, whether second audio captured at the first and second audio sensors at a later time includes second speech generated by a second speaker wearing the wearable electronic device. In Example No. 24, the second speaker is any speaker.

Example No. 25 is the tangible machine readable storage medium of Example No. 24, wherein the phase shift is a first phase shift. In Example No. 25 the instructions also cause the machine to determine a second phase shift between a third sample captured at the first microphone and a fourth sample captured at the second audio sensor. In Example No. 25, the third sample and the fourth sample are samples of the second audio signal.

Example No. 26 is the tangible machine readable storage medium of Example No. 24, wherein the determining of whether the second audio signal includes second speech generated by the second speaker includes comparing the first phase shift to the second phase shift.

Example No. 27 is the tangible machine readable storage medium of any of Example Nos. 24, 25, and 26, wherein the instructions further cause the machine to string first chunks of the second audio together, and remove second chunks of the second audio. In Example No. 27, the first chunks are determined to include second speech generated by the second speaker and the second chunks are determined not to include second speech generated by the second speaker.

Example No. 28 is the tangible machine readable storage medium of any of Example Nos. 24, 25, and 26, wherein the instructions further cause the machine to segment the first sample of the first audio into a set of frames and convert the portions of the first sample included in the set of frames into respective sets of signal pulses occupying frequency bins. The instructions of Example No. 28 further cause the machine to select for respective frequency bins, respective subsets of the frames. In Example No. 28, the portions of the first sample corresponding to the subsets of the frames have a threshold signal to noise ratio.

Example No. 29 is the tangible machine readable storage medium of any of Example Nos. 24, 25 and 26, wherein the first speaker and the second speaker are a same speaker.

Example No. 30 is the tangible machine readable storage medium of any of Example Nos. 24, 25, and 26, wherein the determining of the phase shift includes determining a first phase angle of the first sample at a first frequency. The first phase angle is calculated based on the portions of the first sample corresponding to a first selected subset of the frames for the first frequency bin. The instructions of Example No. 30 further cause the machine to determine a second phase angle of the second sample at the first frequency. The second phase angle is calculated based on the portions of the second sample corresponding to the first selected subset of the frames for the first frequency.

Example No. 31 is the tangible machine readable medium of any of Example Nos. 24, 25 and 26, wherein the phase shift is a wrapped phase shift, and the determining of the phase shift further includes unwrapping the wrapped phase shift by adding a multiple of $2\pi$ to the wrapped phase shift.

Example No. 32 is an audio source identifier that includes first means to determine a phase shift between a first sample of a first audio captured at a first audio sensor and a second sample of the first audio captured at a second audio sensor. In the audio source identifier of Example No. 32, the first audio sensor is disposed at a first location on a wearable electronic device and the second audio sensor is disposed at a second location on the wearable device. Additionally, the first audio includes first speech generated by a first person wearing the wearable electronic device. The audio source identifier of Example No. 32 also includes second means to determine, based on the phase shift determined by the phase shift determiner, whether a second audio includes second speech generated by a second person. In Example No. 32, the second person is any person wearing the wearable electronic device.

Example No. 33 is the audio source identifier of Example No. 32, wherein the first person and the second person are a same person.

Example No. 34 is the audio source identifier of any of Example Nos. 32 and 33, wherein the phase shift is a first phase shift and the first means to determine the phase shift is further to determine a second phase shift between a third sample of the second audio and a fourth sample of the second audio.

Example No. 35 is the audio source identifier of Example No. 34, wherein the second means is further to determine whether the second audio includes speech generated by the second person based on a comparison of the first phase shift to the second phase shift.

Example No. 36 is the audio source identifier of any of Example Nos. 32, 33, 34, and 35, further including third means to resize first chunks of the second audio determined to include speech generated by the second person and to eliminate second chunks of the second audio not determined to include speech generated by the second person.

From the foregoing, it will be appreciated that methods, apparatus, and articles of manufacture that have been disclosed herein enable the detection of speech generated by a wearer of an electronic device while discarding speech and/or sound not generated by the wearer of the electronic device. Further the disclosed methods, apparatus, and articles of manufacture enable the detection of a speech generated by a wearer of the device in a manner that is agnostic as to identity of the wearer. As a result, there is no need to train the device with audio samples uttered by a specific person. Instead, the speech uttered by a first person wearing the device is analyzed and stored and then used to identify whether any subsequently captured audio signals include speech generated by any person (the first person or any other person) wearing the wearable electronic device. Further the disclosed methods, apparatus, and articles of manufacture enable the efficient detection of wearer speech by selecting and analyzing audio data associated with frequency bins and data frames most likely to include wearer-generated speech, thereby reducing the amount of processing required to be performed and also enhancing the likelihood that wearer-generated speech is accurately detected. The disclosed methods, apparatus, and articles of manufacture are also able to detect wearer-generated speech in a manner that is content-agnostic. Thus, there is no need to train the device to recognize a particular trigger phrase such as "okay Google" or "Hey Siri," and the user is not required to preface commands, queries, etc. directed to the wearable electronic device with such trigger phrases. Eliminating the need for trigger phrases enables a more natural speech experience for the user of the device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An audio source identifier comprising:
a first audio sensor disposed at a first location on a wearable electronic device;
a second audio sensor disposed at a second location on the wearable electronic device;
a phase shift determiner to:
determine a first phase shift between a first sample of first audio captured at the first audio sensor and a second sample of the first audio captured at the second audio sensor, the first audio including first speech generated by a first person while wearing the wearable electronic device; and
determine a second phase shift between a third sample of second audio captured at the first audio sensor and a fourth sample of the second audio captured at the second audio sensor; and
a speaker identifier to determine, based on the first phase shift determined by the phase shift determiner, whether the second audio includes second speech generated by a second person currently wearing the wearable electronic device.

2. The audio source identifier of claim 1, wherein the second person is the first person.

3. The audio source identifier of claim 1, wherein the speaker identifier is further to determine whether the second audio includes second speech generated by the second person wearing the wearable electronic device based on a comparison of the first phase shift to the second phase shift.

4. The audio source identifier of claim 1, further including a phrase detector to resize chunks of the second audio and to eliminate chunks of the second audio signal not determined to include second speech generated by the second person.

5. The audio source identifier of claim 1, further including:
a frame segmenter to divide the first sample into a set of frames;
a frequency analyzer to convert portions of the first sample included in the sets of frames into respective sets of signal pulses, the signal pulses occupying frequency bins; and
a selector to select, for respective ones of the frequency bins, respective subsets of the frames, the portions of the first sample corresponding to the subsets of the frames having a threshold signal to noise ratio.

6. The audio source identifier of claim 1, wherein the phase shift determiner is to calculate a plurality of phase shifts between the first sample and the second sample at respective frequencies, plot the plurality of phase shifts against the respective frequencies, and apply curve fitting to identify a slope of a line representing a change in phase shift relative to a change in frequency.

7. The audio source identifier of claim 1, wherein the speaker identifier is to unwrap the first phase shift determined by the phase shift determiner to determine whether the second audio includes second speech generated by the second person.

8. The audio source identifier of claim 7, further including a slope estimator to estimate the slope of a line formed from a plot of a plurality of phase shifts, including the unwrapped first phase shift, against corresponding frequencies.

9. A method to determine a source of audio, the method comprising:
collecting, at a first microphone, a first sample of first audio, the first microphone at a first location on a wearable electronic device;
collecting, at a second microphone, a second sample of the first audio, the second microphone at a second location on the wearable electronic device;
determining a first phase shift between the first sample and the second sample, the first sample and the second sample being different samples of the first audio, the first audio including first speech known to have been generated by a first person while wearing the wearable electronic device;
determining a second phase shift between a third sample of second audio captured at the first microphone and a fourth sample of the second audio captured at the second audio sensor; and determining, based on the first phase shift, whether the second audio captured at the first and second microphones includes second speech generated by a second person, the second person being any person currently wearing the wearable electronic device.

10. The method of claim 9, wherein the second person is the first person.

11. The method of claim 9, wherein the determining of whether the second audio signal includes second speech generated by the second person wearing the wearable electronic device includes comparing the first phase shift to the second phase shift.

12. The method of claim 9, further including:
resizing first chunks of the second audio; and
removing second chunks of the second audio, the second chunks determined not to include second speech generated by the second person.

13. The method of claim 9, further including:
segmenting the first sample of the first audio into a set of frames;
converting portions of the first sample included in the set of frames into respective sets of signal pulses, the signal pulses occupying frequency bins; and
selecting, for respective ones of the frequency bins, respective subsets of the frames, the portions of the first audio corresponding to the subsets of the frames having a threshold signal to noise ratio.

14. The method of claim 13, wherein the determining of the first phase shift includes determining a first phase angle of the first sample at a first frequency corresponding to a first frequency bin, the first phase angle calculated based on the portions of the first sample corresponding to a first selected subset of the frames for the first frequency bin, and determining a second phase angle of the second sample at the first frequency, the second phase angle calculated based on the portions of the second sample corresponding to the first selected subset of the frames for the first frequency bin.

15. The method of claim 9, wherein the determining of the first phase shift includes calculating a plurality of phase shifts between the first sample and the second sample at a set of selected frequencies, plotting the plurality of phase shifts against the selected frequencies, and applying curve fitting to the plurality of phase shifts to identify an expected change in phase shift relative to the set of selected frequencies.

16. The method of claim 9, wherein the first phase shift is a wrapped first phase shift, and the determining of the first phase shift further includes unwrapping the wrapped first phase shift by adding a multiple of $2\pi$ to the wrapped first phase shift.

17. The method of claim 14, further including estimating a slope of a line formed by plotting changes in unwrapped phase shifts against corresponding changes in frequency.

18. A non-transitory computer readable medium comprising instructions which, when executed, cause a machine to at least:
determine a first phase shift between a first sample of first audio collected at a first audio sensor and a second sample of the first audio collected at a second audio sensor, the first and second audio sensors at different locations on a wearable electronic device, and the first audio signal to include first speech generated by a first person while wearing the wearable electronic device at a first time;
determine a second phase shift between a third sample of second audio captured at the first microphone and a fourth sample of the second audio captured at the second audio sensor; and
determine, based on the first phase shift, whether the second audio captured at the first and second audio sensors at a second time later than the first time includes second speech generated by a second person currently wearing the wearable electronic device.

19. The non-transitory computer readable medium of claim 18, wherein the second person is the first person.

20. The non-transitory computer readable medium of claim 18, wherein the instructions, when executed, cause the machine to compare the first phase shift to the second phase shift to determine whether the second audio includes second speech generated by the second person.

21. The non-transitory computer readable medium of claim 18, wherein the instructions, when executed, further cause the machine to:
string first chunks of the second audio together, the first chunks determined to include second speech generated by the second person; and
remove second chunks of the second audio, the second chunks determined not to include second speech generated by the second person.

22. The non-transitory computer readable medium of claim 18, wherein the instructions, when executed, further cause the machine to:
segment the first sample of the first audio into a set of frames;
convert portions of the first sample included in the set of frames into respective sets of signal pulses, the signal pulses occupying frequency bins; and
select for respective frequency bins, respective subsets of the frames, the portions of the first sample corresponding to the subsets of the frames having a threshold signal to noise ratio.

23. The non-transitory computer readable medium of claim 22, wherein to determine the first phase shift, the instructions, when executed, cause the machine to:
determine a first phase angle of the first sample at a first frequency, the first phase angle calculated based on the portions of the first sample corresponding to a first selected subset of the frames for the first frequency bin, and;
determine a second phase angle of the second sample at the first frequency, the second phase angle calculated based on the portions of the second sample corresponding to the first selected subset of the frames for the first frequency.

24. The non-transitory computer readable medium of claim 18, wherein the first phase shift is a wrapped first phase shift, and to determine the first phase shift, the instructions, when executed, cause the machine to unwrap the wrapped first phase shift by adding a multiple of $2\pi$ to the wrapped first phase shift.

* * * * *